(12) United States Patent
Shirakata

(10) Patent No.: US 7,729,060 B2
(45) Date of Patent: Jun. 1, 2010

(54) LENS BARREL AND IMAGE PICKUP APPARATUS

(75) Inventor: Satoshi Shirakata, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/292,982

(22) Filed: Dec. 2, 2008

(65) Prior Publication Data

US 2009/0185298 A1 Jul. 23, 2009

(30) Foreign Application Priority Data

Jan. 18, 2008 (JP) ............................. 2008-009857

(51) Int. Cl.
G02B 7/02 (2006.01)
(52) U.S. Cl. ..................... 359/701; 359/699; 359/700
(58) Field of Classification Search .......... 359/819–829
See application file for complete search history.

(56) References Cited

U.S. PATENT DOCUMENTS

| 5,262,898 | A | * | 11/1993 | Nomura | 359/700 |
| 5,293,192 | A | * | 3/1994 | Akitake et al. | 396/62 |
| 5,589,987 | A | * | 12/1996 | Tanaka | 359/701 |
| 2006/0291078 | A1 | * | 12/2006 | Mitani et al. | 359/819 |
| 2007/0153403 | A1 | * | 7/2007 | Yamazaki | 359/819 |

FOREIGN PATENT DOCUMENTS

| JP | 2001-124972 A | 5/2001 |
| JP | 2004-085932 A | 3/2004 |
| JP | 2005-227651 A | 8/2005 |
| JP | 2007-093999 A | 4/2007 |
| JP | 2007-094118 | 4/2007 |

OTHER PUBLICATIONS

Japanese Office Action issued Nov. 19, 2009 for corresponding Japanese Application No. 2008-009857.

* cited by examiner

*Primary Examiner*—Ricky L Mack
*Assistant Examiner*—Vipin M Patel
(74) *Attorney, Agent, or Firm*—Rader, Fishman & Grauer PLLC

(57) ABSTRACT

An engagement pawl of a linear-movement guide ring engages with an engagement groove of a cam ring, and hence the cam ring is supported by the linear-movement guide ring non-movably in an optical-axis direction. When the cam ring is rotated, a cam pin of a second group moving frame moves in the optical-axis direction along a cam groove formed in an inner periphery of the cam ring. The cam groove includes a plurality of first cam grooves and a plurality of second cam grooves. The engagement groove of the cam ring intersects with the second cam groove. The engagement pawl has a width larger than a groove width of the second cam groove intersecting with the engagement groove.

4 Claims, 25 Drawing Sheets

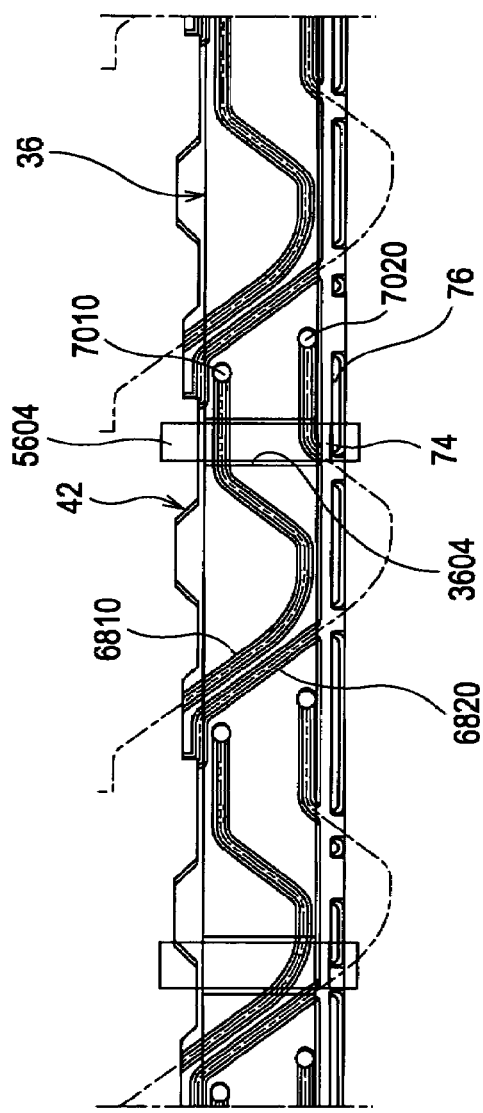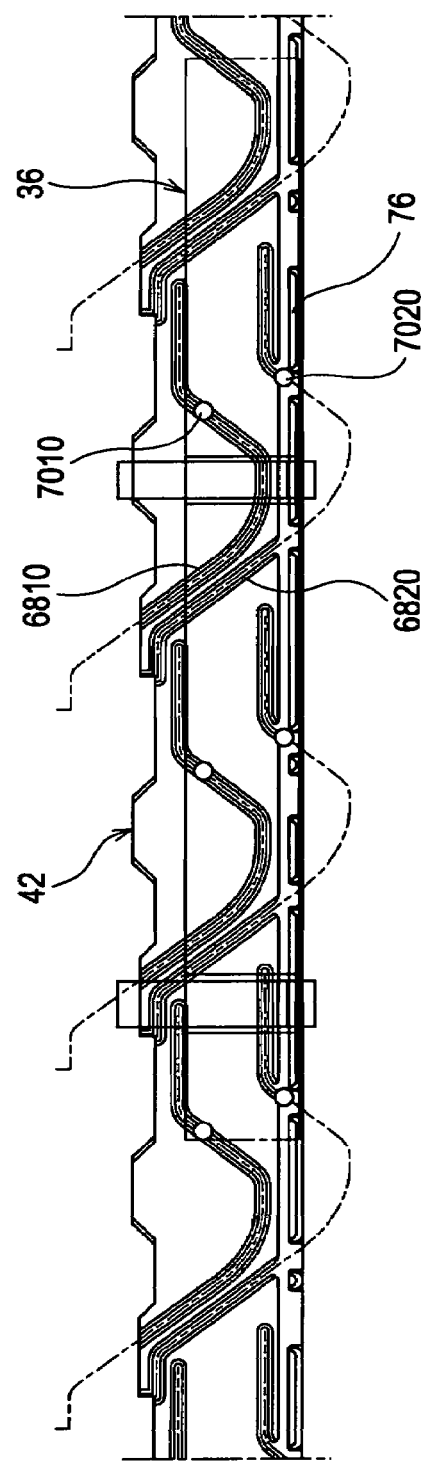
FIG. 18A
FIG. 18B

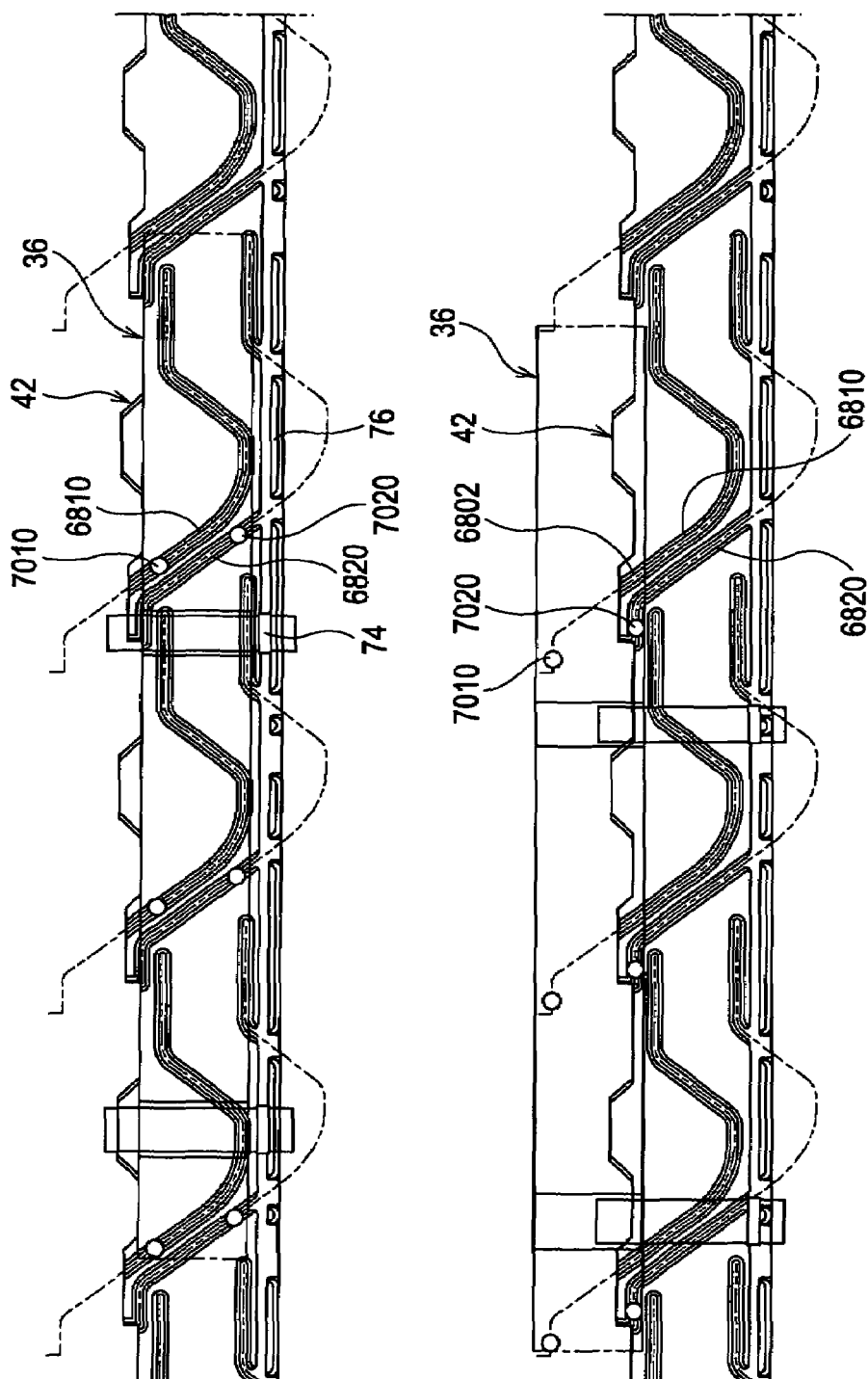

LENS BARREL AND IMAGE PICKUP APPARATUS

CROSS REFERENCES TO RELATED APPLICATIONS

The present invention contains subject matter related to Japanese Patent Application JP 2008-009857 filed in the Japanese Patent Office on Jan. 18, 2008, the entire contents of which are incorporated herein by reference.

BACKGROUND OF THE INVENTION

1. Field of the Invention

The present invention relates to a lens barrel and an image pickup apparatus.

2. Description of the Related Art

A lens barrel of an image pickup apparatus such as a digital still camera is provided, in which a zoom lens moves in an optical-axis direction for a zooming operation.

Such a lens barrel includes a moving frame which supports a lens and has a cam pin, a linear-movement guide ring which guides the moving frame non-rotatably around an optical axis of the lens but movably in the optical-axis direction, and a cam ring which has a cam groove in a peripheral surface of the cam ring and which is supported by the linear-movement guide ring non-movably in the optical-axis direction but rotatably around the optical axis, the cam pin of the moving frame engaging with the cam groove.

In the lens barrel, an engagement pawl (bayonet pawl) provided at the linear-movement guide ring engages with an engagement groove (bayonet groove) formed in the peripheral surface of the cam ring to extend in a circumferential direction of the peripheral surface, and hence, the cam ring is supported by the linear-movement guide ring. When the cam ring is rotated, the moving frame moves in the optical-axis direction via the cam groove and the cam pin.

Meanwhile, in recent years, a compact and high-performance image pickup apparatus is demanded. Thus, a lens barrel advantageous to providing a high zoom ratio and reducing the size is desired. It is therefore necessary to reduce the size of the cam ring while a moving amount of the moving frame is sufficiently provided.

Regarding the situation, a lens barrel has been suggested (see Japanese Unexamined Patent Application Publication No. 2007-94118), in which a cam groove of a cam ring intersects with an engagement groove, thereby reducing the size of the cam ring in an optical-axis direction.

SUMMARY OF THE INVENTION

In the related example, the depth of the cam groove should be larger than the depth of the engagement groove in an intersection portion of the cam groove and the engagement groove, to prevent a cam pin from erroneously entering the engagement groove from the cam groove.

However, the thickness of the cam ring has to be increased. This is disadvantageous to reducing the size of the cam ring in a radial direction. Also, an engaging depth (fitting amount) of the cam pin with respect to a wall surface which defines the cam groove is decreased when the cam pin is located at the intersection portion, as compared with a condition in which the cam pin engages with a portion of the cam groove not occupied by the intersection portion. Thus, The increased thickness is disadvantageous to providing a smooth operation of the cam pin at the intersection portion.

In light of the above-described situations, it is desirable to provide a lens barrel and an image pickup apparatus advantageous to sufficiently providing a moving amount of a moving frame and reducing the size.

According to an embodiment of the present invention, a lens barrel includes a moving frame which supports a lens system defining an imaging optical system, and has a cam pin; a linear-movement guide ring which guides the moving frame mutually non-rotatably but movably in an optical-axis direction of the lens system; and a cam ring which is supported by the linear-movement guide ring mutually rotatably but non-movably in the optical axis direction, and has a cam groove in a peripheral surface of the cam ring, the cam pin engaging with the cam groove. The support of the cam ring by the linear-movement guide ring is provided when an engagement pawl provided at the linear-movement guide ring engages with an engagement groove formed in the peripheral surface of the cam ring in a plane orthogonal to an axial direction of the cam ring to extend in a circumferential direction of the peripheral surface. The moving frame moves in the optical-axis direction via the cam groove and the cam pin when the cam ring is rotated. The cam groove includes a plurality of first cam grooves provided at intervals in the circumferential direction of the peripheral surface, and a plurality of second cam grooves provided at positions of the peripheral surface at intervals in the circumferential direction of the peripheral surface, the positions being different from those of the first cam grooves in an axial direction, the first and second cam grooves having equivalent loci. The cam pin includes first and second cam pins which respectively engage with the first and second cam grooves. The engagement groove intersects with at least one of the first and second cam grooves. The engagement pawl has a width larger than a groove width of the first or second cam groove which intersects with the engagement groove.

According to another embodiment of the present invention, an image pickup apparatus includes a lens barrel including a moving frame which supports a lens system defining an imaging optical system, and has a cam pin; a linear-movement guide ring which guides the moving frame mutually non-rotatably but movably in an optical-axis direction of the lens system; and a cam ring which is supported by the linear-movement guide ring mutually rotatably but non-movably in the optical axis direction, and has a cam groove in a peripheral surface of the cam ring, the cam pin engaging with the cam groove. The support of the cam ring by the linear-movement guide ring is provided when an engagement pawl provided at the linear-movement guide ring engages with an engagement groove formed in the peripheral surface of the cam ring in a plane orthogonal to an axial direction of the cam ring to extend in a circumferential direction of the peripheral surface. The moving frame moves in the optical-axis direction via the cam groove and the cam pin when the cam ring is rotated. The cam groove includes a plurality of first cam grooves provided at intervals in the circumferential direction of the peripheral surface, and a plurality of second cam grooves provided at positions of the peripheral surface at intervals in the circumferential direction of the peripheral surface, the positions being different from those of the first cam grooves in an axial direction, the first and second cam grooves having equivalent loci. The cam pin includes first and second cam pins which respectively engage with the first and second cam grooves. The engagement groove intersects with at least one of the first and second cam grooves. The engagement pawl has a width larger than a groove width of the first or second cam groove which intersects with the engagement groove.

With the embodiments of the present invention, although the engagement groove of the cam ring intersects with at least one of the first and second cam grooves of the linear-movement guide ring, since the engagement pawl of the linear-movement guide ring has the width larger than the groove width of the first or second cam groove intersecting with the engagement groove, the engagement pawl is prevented from disengaging from the engagement groove and entering the first or second cam groove through the intersection portion.

Accordingly, the embodiments are advantageous to sufficiently reducing the size of the cam ring in the optical-axis direction and sufficiently providing the moving amount of the moving frame. In addition, a smooth operation of the first or second cam pin is provided at the intersection portion of the engagement groove and the first or second cam groove.

BRIEF DESCRIPTION OF THE DRAWINGS

FIGS. 18A and 18B are explanatory diagrams each showing operations of the moving frame, the cam ring, and the linear-movement guide ring;

FIGS. 20E and 20F are explanatory diagrams each showing operations of the moving frame, the cam ring, and the linear-movement guide ring;

DESCRIPTION OF THE PREFERRED EMBODIMENTS

Embodiments of the present invention are described below with reference to the attached drawings.

First Embodiment

In this embodiment, a case is described in which a lens barrel according to an embodiment of the present invention is installed in an image pickup apparatus.

Figure 1:
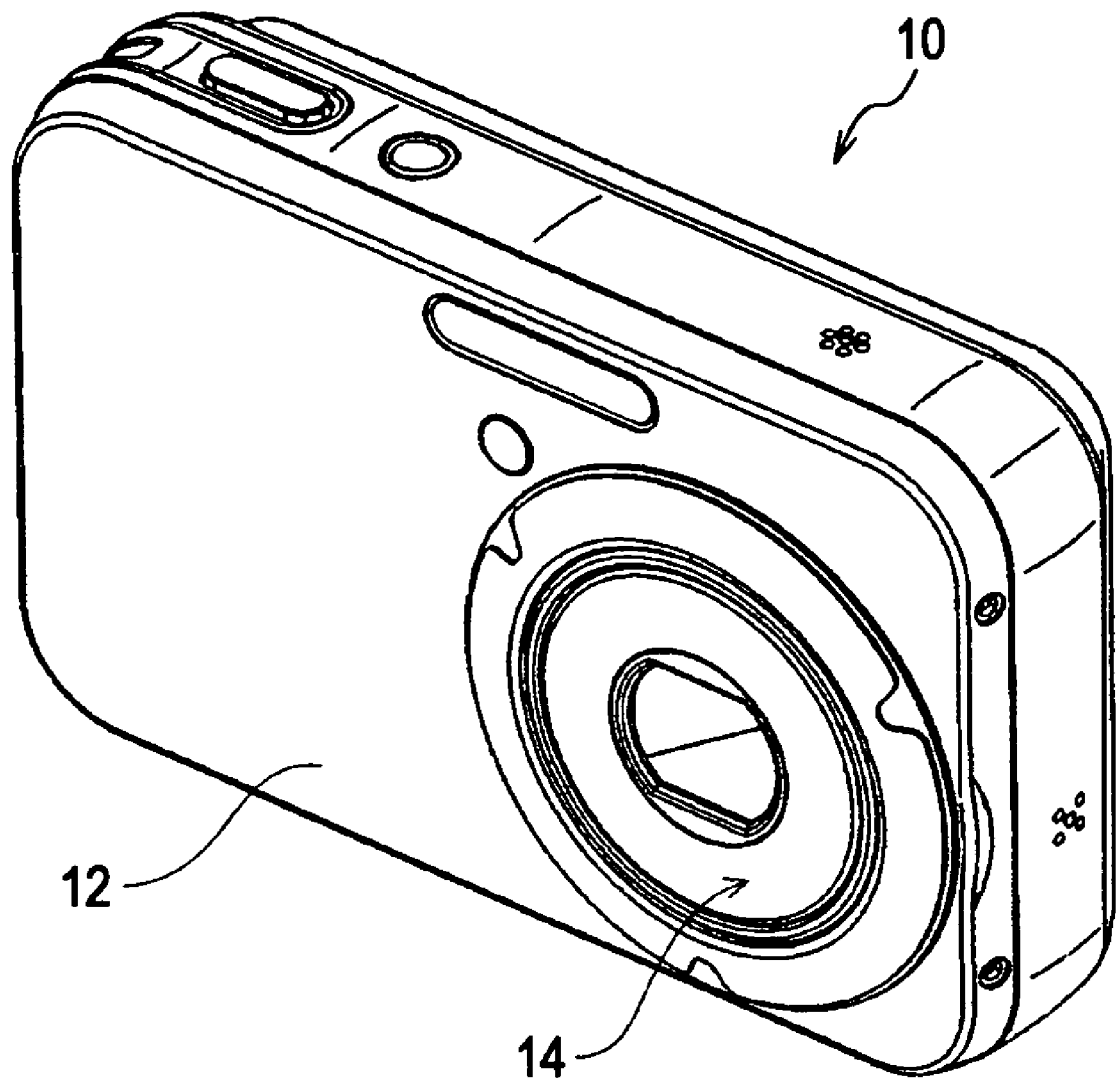
FIG. 1 is a perspective view showing a condition in which a lens barrel of an image pickup apparatus is located at a collapsed position.
Figure 2:
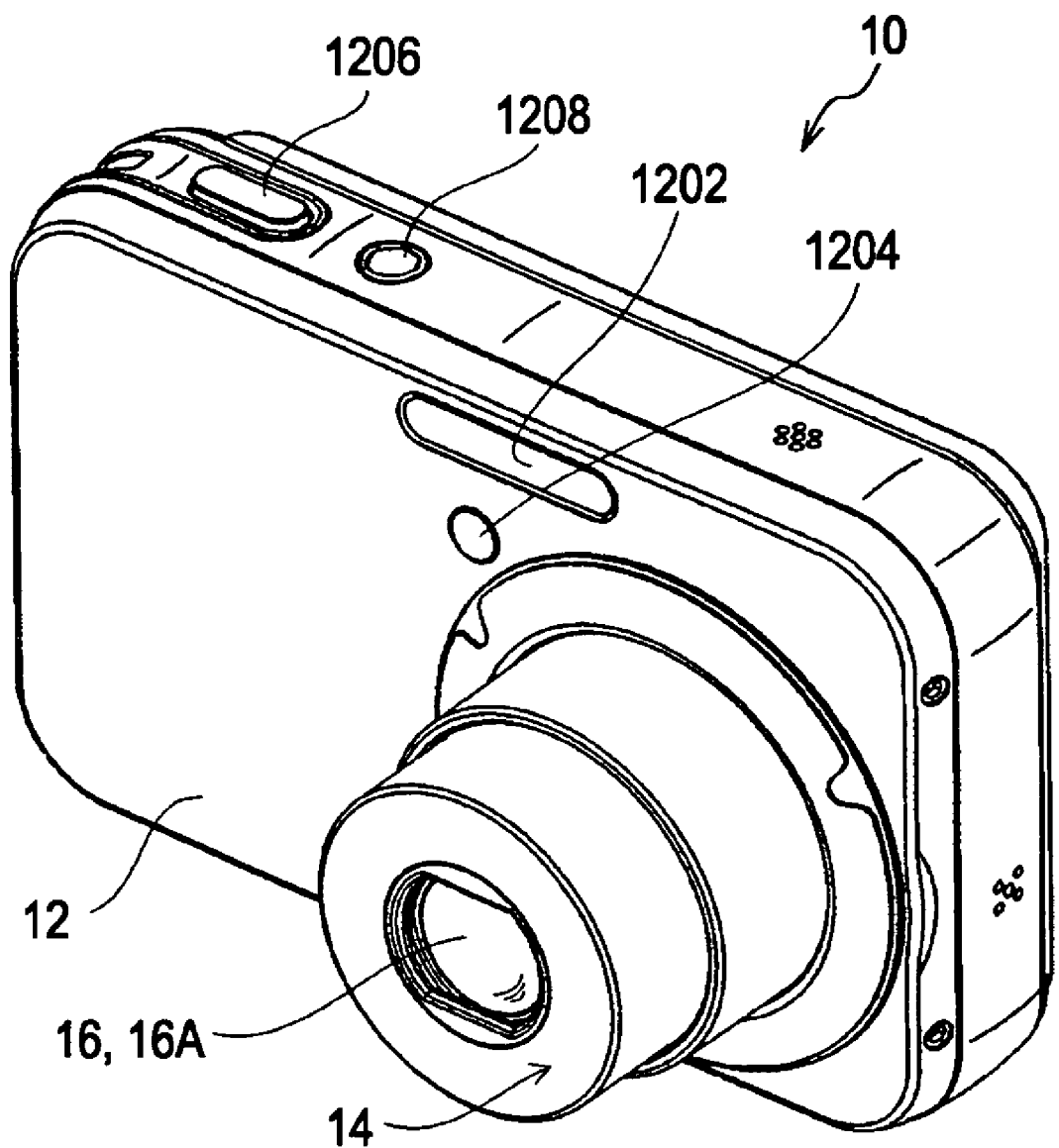
FIG. 2 is a perspective view showing a condition in which the lens barrel of the image pickup apparatus is located at a use position.
Figure 3:
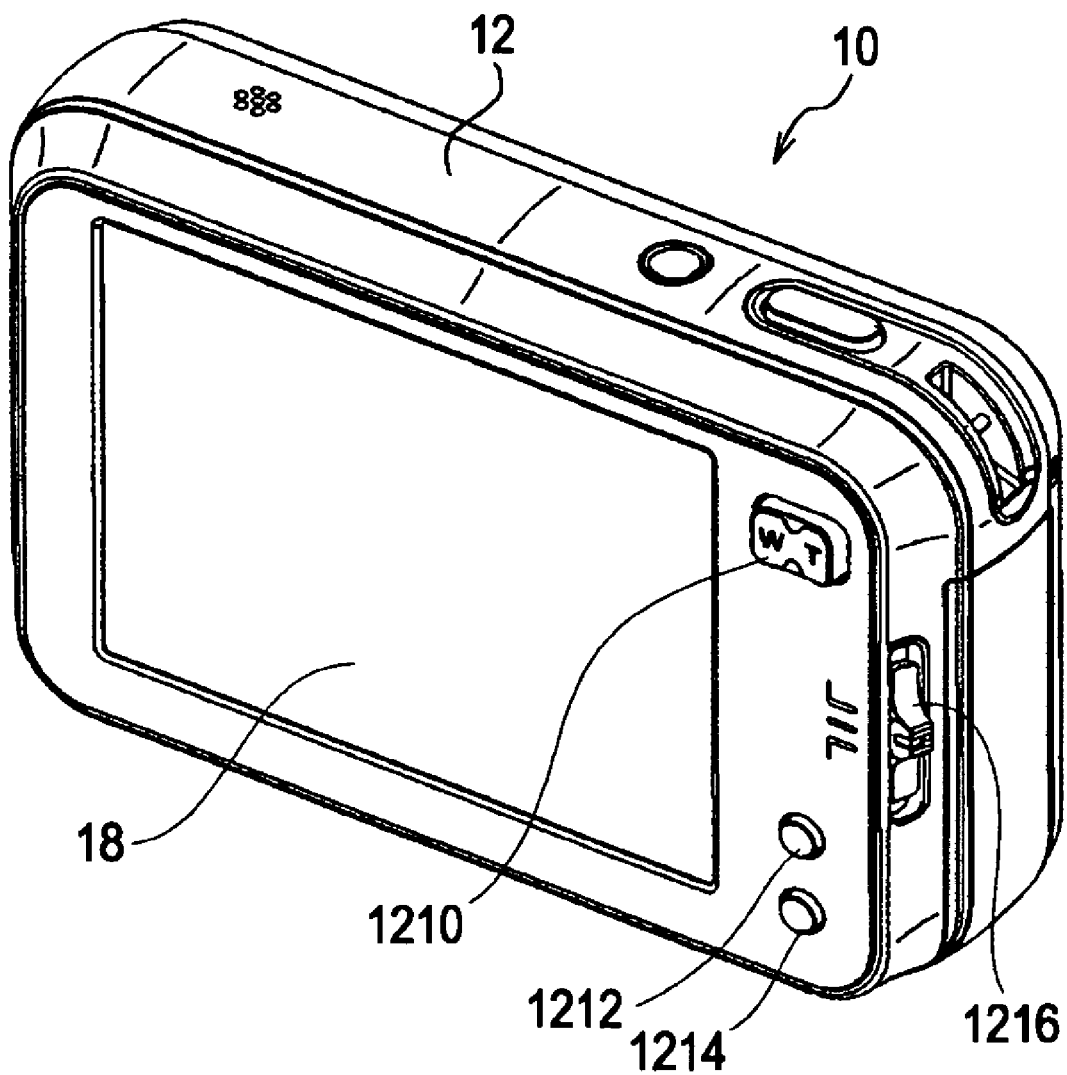
FIG. 3 is a perspective view showing a rear surface of the image pickup apparatus.
Figure 4:
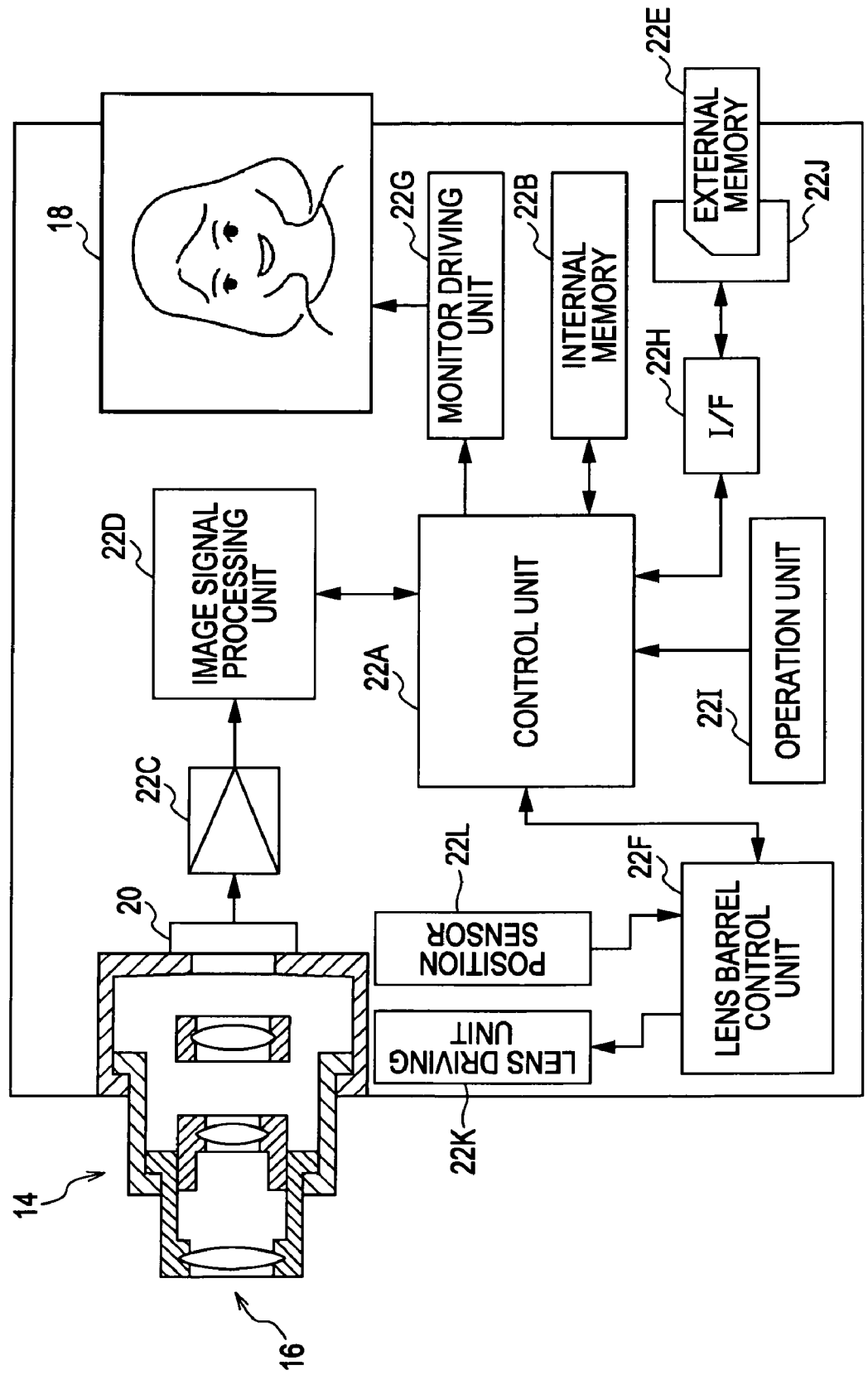
FIG. 4 is a block diagram showing a control system of the image pickup apparatus.

FIG. 1 is a perspective view showing a condition in which a lens barrel 14 of an image pickup apparatus 10 is located at a collapsed position. FIG. 2 is a perspective view showing a condition in which the lens barrel 14 of the image pickup apparatus 10 is located at a use position. FIG. 3 is a perspective view showing a rear surface of the image pickup apparatus 10. FIG. 4 is a block diagram showing a control system of the image pickup apparatus 10.

Throughout the specification, it is expected that the left and right sides are determined when the image pickup apparatus is viewed from the front side. The side of an object is called front side, and the side of an image pickup element is called rear side.

(Image Pickup Apparatus 10)

Referring to FIGS. 1 and 2, the image pickup apparatus 10 is a digital still camera, and has a case 12 which defines an exterior.

The lens barrel 14 according to this embodiment is installed in a right portion of the case 12.

The lens barrel 14 includes an imaging optical system 16 which guides an object image to an image pickup element 20 (see FIG. 4). An object image is formed through the imaging optical system 16. The image pickup element 20 captures the formed object image and generates an image pickup signal. The image pickup element 20 is formed of a charge-coupled device (CCD) sensor or a complementary mental-oxide semiconductor (CMOS) sensor.

The imaging optical system 16 includes a plurality of lenses. An objective lens 16A is one of the lenses located at the most object side.

The lens barrel 14 moves between a housed position at which the objective lens 16A is retracted into a front surface of the case 12 as shown in FIG. 1 and a protruding position at which the objective lens 16A protrudes as shown in FIG. 1.

Referring to FIG. 2, for example, a flash 1202 which emits a photographic auxiliary light, and a light-emitting portion 1204 which emits an auto-focus auxiliary light are provided at an upper center portion of the front surface of the case 12.

A shutter button 1206 for shooting an image, and a power button 1208 are provided at a top surface of the case 12.

Referring to FIG. 3, a mode selection switch 1216 which selects a function mode (e.g., still image, movie, reproduction) is provided at a left surface of the case 12.

A display panel 18, on which a captured still image or movie, or a menu screen is displayed, is provided at a substantially center portion of the rear surface of the case 12. The display panel 18 may be an existing display panel, such as a liquid crystal display panel or an organic electroluminescence (EL) display panel.

Herein, a touch panel having a touch operation function, which is capable of an operation through operator's contact on a display surface, may be optionally provided on the display surface of the display panel 18.

An optical zoom operation button 1210 which performs a zooming operation, a menu button 1212 which selects a menu, and a display change button 1214 which changes a screen display, and the like, are provided at a left portion of the rear surface of the case 12.

(Control System)

Referring to FIG. 4, the image pickup apparatus 10 includes, in addition to the image pickup element 20 and the display panel 18, a control unit 22A, an internal memory 22B having a program memory, a data memory, a RAM, a ROM, and so on, for driving the control unit 22A, an amplifier 22C which amplifies an image pickup signal supplied from the image pickup element 20, an image signal processing unit 22D which processes the image pickup signal supplied from the amplifier 22C into a predetermined signal, an external memory 22E, such as a memory card, for increasing a storage capacity, a lens barrel control unit 22F which controls driving of the lens barrel 14, a monitor driving unit 22G which drives the display panel 18, an interface (I/F) 22H, and an operation unit 22I.

The control unit 22A includes, for example, an arithmetic circuitry having a microcomputer (CPU). The control unit 22A controls the internal memory 22B, the amplifier 22C, the image signal processing unit 22D, the lens barrel control unit 22F, the monitor driving unit 22G, the interface (I/F) 22H, and the operation unit 22I.

The external memory 22E can be connected to the interface 22H via a connector 22J, in an attachable and detachable manner.

The operation unit 22I includes the shutter button 1206, the power button 1208, the optical zoom operation button 1210, the menu button 1212 for selecting a menu, the display change button 1214 for changing a screen display, and so on. The operation unit 22I inputs an operation signal to the control unit 22A.

The lens barrel control unit 22F is connected to a lens driving unit 22K which controls driving of the lens barrel 14, and a position sensor 22L which detects a rotating amount and a moving amount in an optical-axis direction of the lens barrel 14.

The control unit 22A controls the respective portions in accordance with an operation signal supplied from the operation unit 22I.

In particular, when the shutter button 1206 is operated, the image pickup element 20 captures an image which is guided by the imaging optical system 16 to an image pickup surface of the image pickup element 20. The image pickup element 20 generates an image pickup signal. The image pickup signal is supplied to the image signal processing unit 22D via the amplifier 22C.

The signal processed into a predetermined image signal by the image signal processing unit 22D is supplied to the control unit 22A.

Accordingly, the signal corresponding to the image of the object is supplied from the control unit 22A to the monitor driving unit 22G, the internal memory 22B, or the external memory 22E.

Accordingly, an image corresponding to the image of the object is displayed on the display panel 18 via the monitor driving unit 22G. Image data is stored in the internal memory 22B or the external memory 22E.

Also, when the optical zoom operation button 1210 is operated, the control unit 22A controls the lens driving unit 22K via the lens barrel control unit 22F. In particular, the lens barrel control unit 22F controls the lens driving unit 22K on the basis of a detection signal from the position sensor 22L so as to perform a zoom operation to a wide-angle side or a telephoto side, thereby controlling the rotating amount and the moving amount in the optical-axis direction of the lens barrel 14.

(Lens Barrel 14)

Next, the structure of the lens barrel 14 is described.

Figure 5:
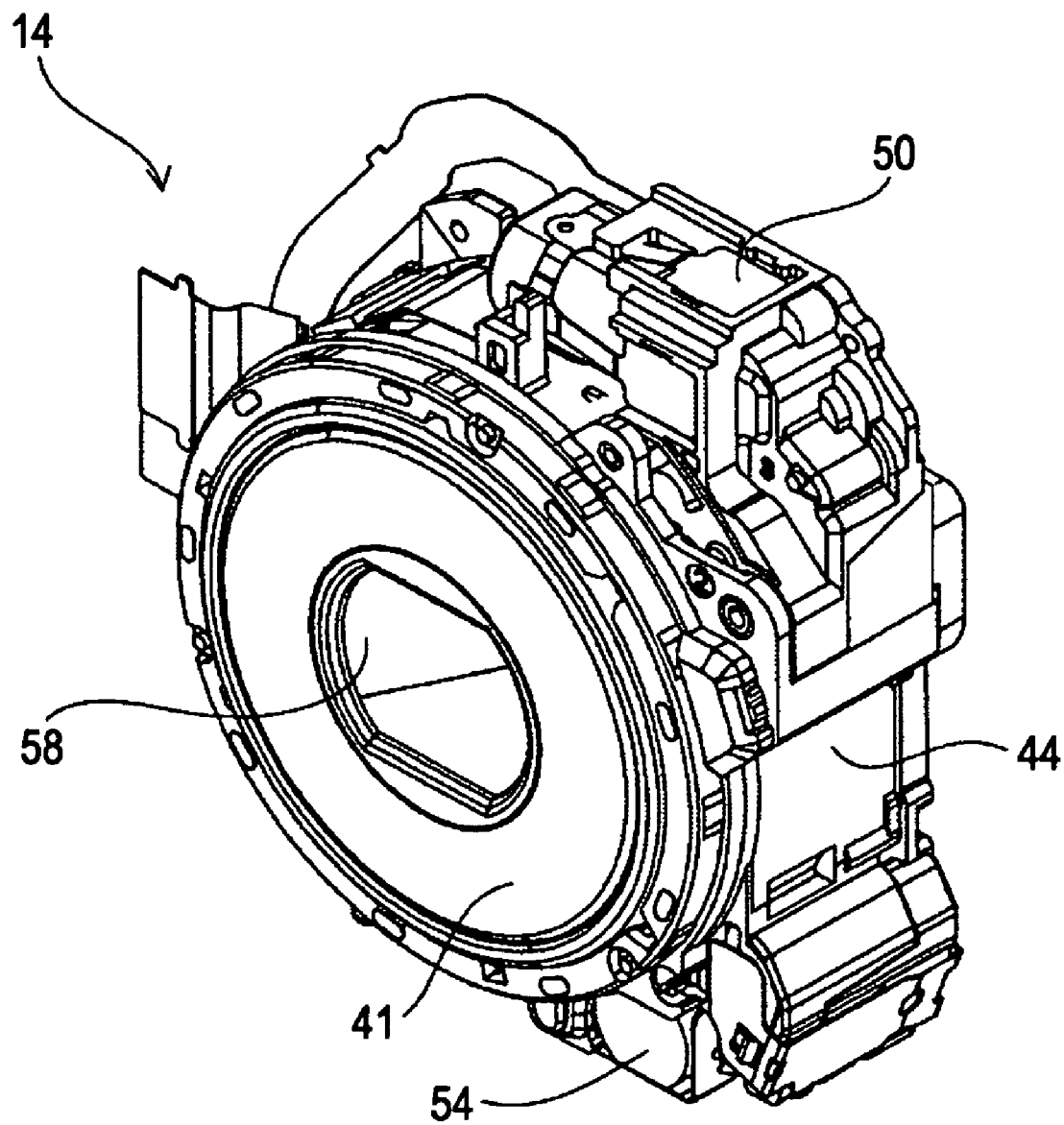
FIG. 5 is a perspective view showing a condition in which the lens barrel according to a first embodiment is located at a housed position.
Figure 6:
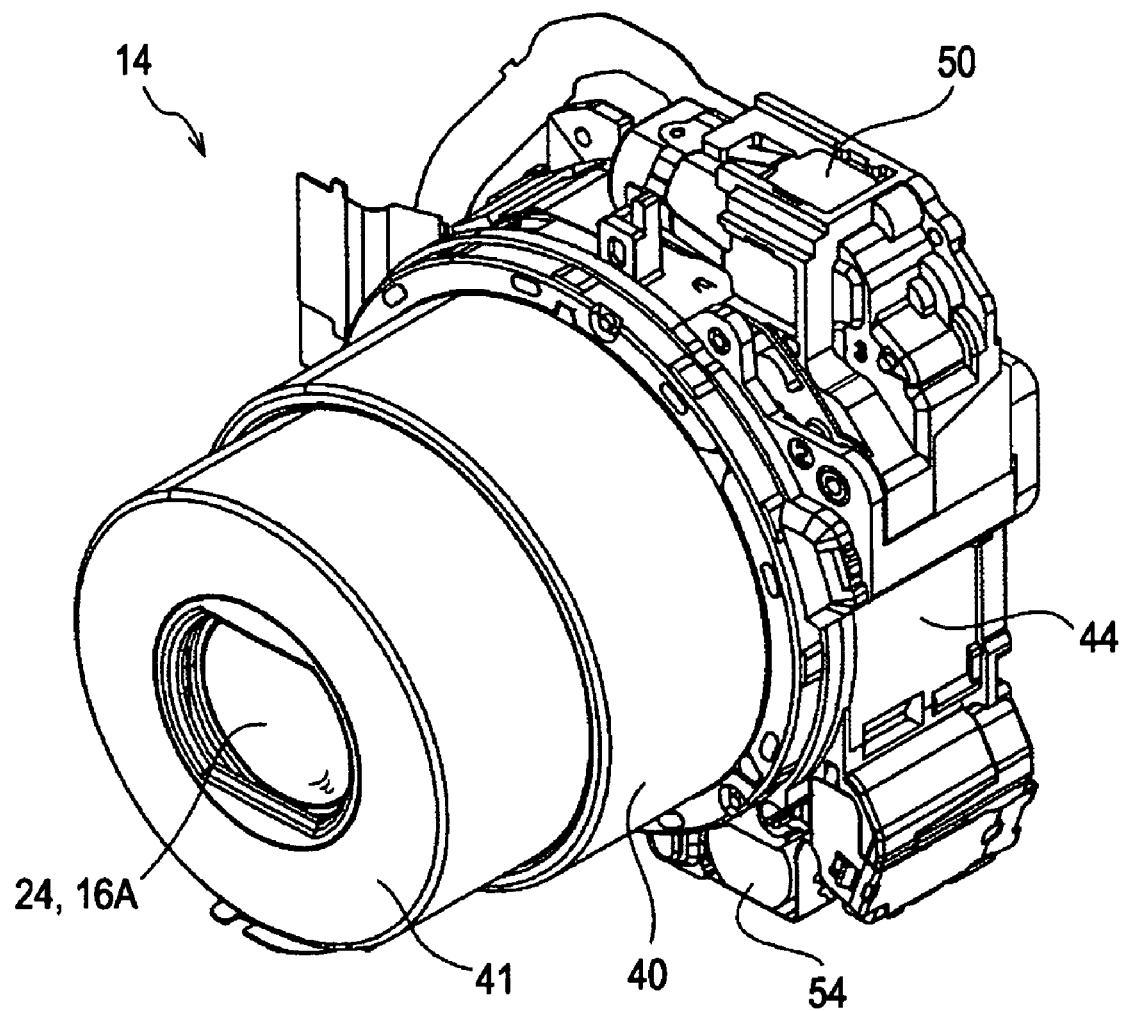
FIG. 6 is a perspective view showing a condition in which the lens barrel according to the embodiment is located at a protruding position.
Figure 7:
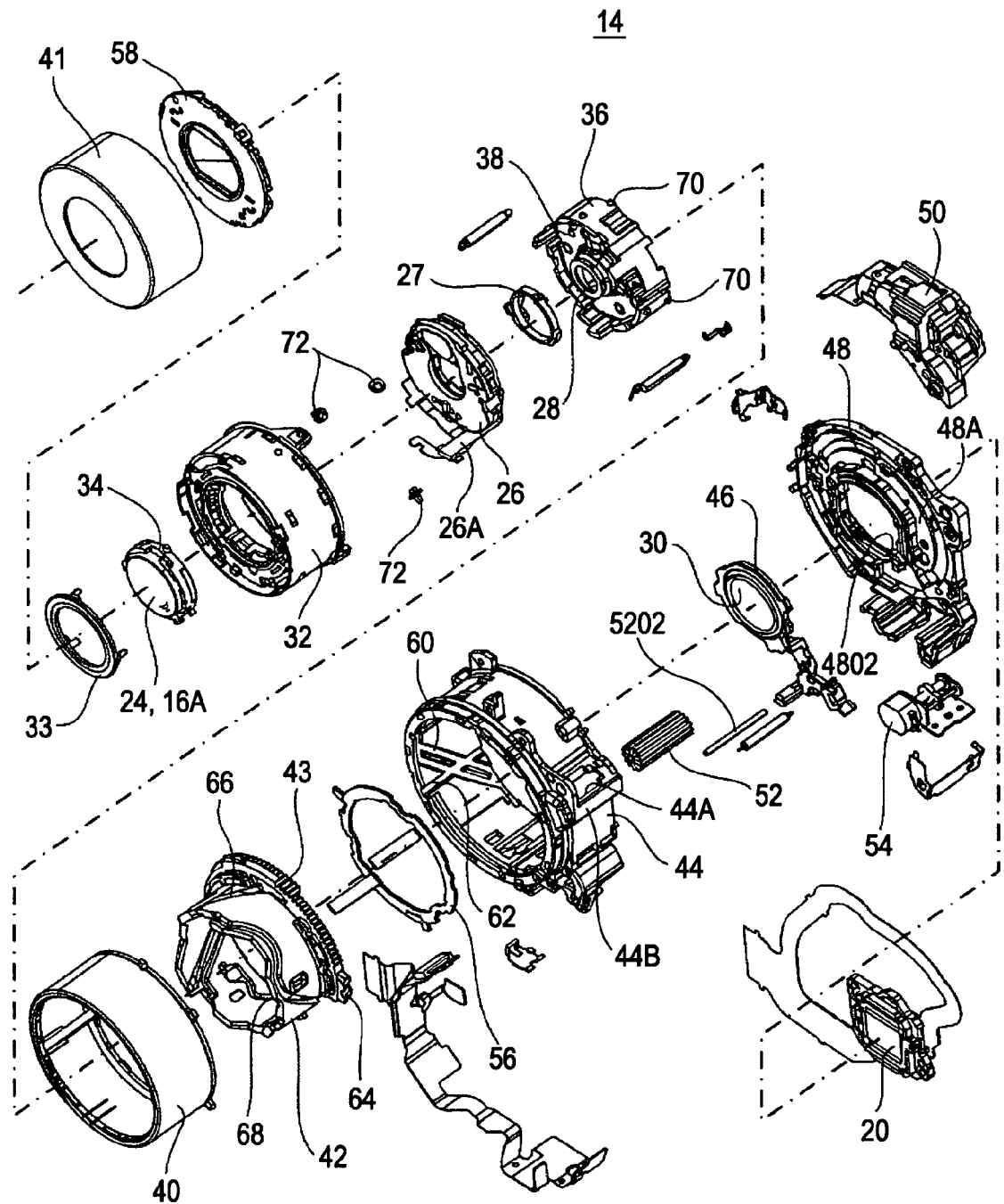
FIG. 7 is an exploded perspective view showing the lens barrel.

FIG. 5 is a perspective view showing a condition in which the lens barrel 14 according to this embodiment is located at the housed position. FIG. 6 is a perspective view showing a condition in which the lens barrel 14 according to this embodiment is located at the protruding position. FIG. 7 is an exploded perspective view showing the lens barrel 14.

Referring to FIG. 7, the imaging optical system 16 of the lens barrel 14 includes a first lens group 24 (objective lens 16A), an automatic exposure device 26, a second lens group 28, and a third lens group 30, in that order from the object side. The first lens group 24 has a plurality of lenses. The automatic exposure device 26 has a shutter and an iris unit. The second lens group 28 has a plurality of lenses. The third lens group 30 has at least one lens.

The first lens group 24 and the second lens group 28 provide a zooming function. A zooming operation of the imaging optical system 16 is performed by moving both lens groups 24 and 28 in the optical-axis direction by a predetermined distance. Also, the third lens group 30 provides a focusing function. A focusing operation of the imaging optical system 16 is performed by moving the third lens group 30 in the optical-axis direction by a predetermined distance.

A mechanic system of the lens barrel 14 includes, in the order from the object side, a first group moving frame 32, a first group lens frame 34 which holds the first lens group 24, a second group lens frame 38 which holds the second lens group 28, a second group moving frame 36 which holds the second group lens frame 38, a linear-movement ring 40, a cam ring 42, a fixed ring 44 which is fixed to the case 12, a third group lens frame 46 which holds the third lens group 30, and a rear barrel 48 which is fixed to a rear portion of the fixed ring 44. The image pickup element 20 is attached to the rear barrel 48.

Also, a power system of the lens barrel 14 includes a rear reduction gear unit 50 and a drive gear 52 which rotationally operate the cam ring 42, and a motor unit 54 which performs the focusing operation of an optical system.

The rear reduction gear unit 50 and the motor unit 54 are attached to an assembly of the fixed ring 44 and the rear barrel 48 as shown in FIG. 5. The drive gear 52 is rotatably supported by the fixed ring 44 and the rear barrel 48.

The rear barrel 48 has a ring-like rear surface portion 48A with a substantially rectangular through hole 4802 at a center portion. The motor unit 54 is supported by the rear surface portion 48A.

The image pickup element 20 is attached to a rear surface of the rear barrel 48 such that the image pickup surface of the image pickup element 20 is exposed through the through hole 4802.

The fixed ring 44 is fixed to a front portion of the rear barrel 48.

The fixed ring 44 is formed of a cylindrical body, which has a substantially cylindrical shape and defines an exterior member of the lens barrel 14. The whole imaging optical system 16 can be housed in the fixed ring 44.

The fixed ring 44 has a cut portion 44A through which a part of the drive gear 52 is exposed, and a cut portion through which a part of the third group lens frame 46 is exposed.

A bearing portion 44B is provided at an outer surface of the fixed ring 44 at a position corresponding to the position of the cut portion 44A. The bearing portion 44B supports an end in an axial direction of a shaft portion 5202 which rotatably supports the drive gear 52.

The shaft portion 5202 is held by the lens barrel assembly of the fixed ring 44 and the rear barrel 48. A substantially whole length in a tooth width direction of teeth of the drive gear 52 rotatably supported by the shaft portion 5202 is exposed to the outside of the lens barrel assembly through the cut portion 44A for a. The rear reduction gear unit 50 is attached so as to cover an exposed portion of the drive gear 52.

The rear reduction gear unit 50 includes, though not illustrated, an output gear meshing with the drive gear 52, at least one reduction gear which transmits power to the output gear, and a zoom motor which rotationally drives the output gear by transmitting power via the reduction gear. The rear reduction gear unit 50 also has a rotation detector, such as a rotary encoder, which detects the number of rotations of the zoom motor and outputs a detection signal.

The motor unit 54 serves as a power source for performing the focusing operation of the lens barrel 14. The motor unit 54 includes a focus motor, and a carriage which is movably screwed with a rotation shaft of the focus motor and guided in the optical-axis direction.

The third group lens frame 46 engages with the carriage of the motor unit 54. Hence, the predetermined focusing operation is performed by moving the third lens group 30 by a predetermined distance in the optical-axis direction, in accordance with a rotating amount of the motor unit 54.

A plurality of cam grooves 60 and a plurality of linear-movement guide grooves 62 are formed in an inner periphery of the fixed ring 44 so as to extend in the optical-axis direction.

The cam ring 42 is arranged inside the fixed ring 44.

The cam ring 42 has engagement portions 64 which engage with the cam grooves 60 of the fixed ring 44.

The drive gear 52 meshes with a gear portion 43 which is provided at a flange portion of the cam ring 42. Accordingly, when the drive gear 52 is rotationally driven by the operation of the rear reduction gear unit 50, the cam ring 42 is rotated counterclockwise or clockwise depending on the rotation direction. The engagement portions 64 of the cam ring 42 move along the cam grooves 60 of the fixed ring 44, and hence the cam ring 42 is moved in the optical-axis direction.

A plurality of outer cam grooves 66 are provided at an outer periphery of the cam ring 42.

A plurality of inner cam grooves 68 are provided at an inner periphery of the cam ring 42.

A linear-movement guide ring 56 is fitted to the cam ring 42 rotatably in the rotation direction but non-movably in the optical-axis direction.

The second group moving frame 36 is provided at the inner periphery of the cam ring 42. The second group moving frame 36 is supported by the linear-movement guide ring 56 non-rotatably but movably only in the optical-axis direction.

Cam pins 70 are provided at the outer periphery of the second group moving frame 36. The cam pins 70 engage with the inner cam grooves 68 of the cam ring 42.

The automatic exposure device 26 is attached to a front portion of the second group moving frame 36, with a distance regulating member 27 interposed therebetween, non-rotatably in the rotation direction but movably in the optical-axis direction by a predetermined distance.

The automatic exposure device 26 is an optical device having a shutter function of opening/closing an optical path through which light passes, a variable aperture function of increasing/decreasing a diameter of the optical path, and a filter function of inserting/removing a filter to/from the optical path.

The first group moving frame 32 is provided between the outer periphery of the cam ring 42 and the inner periphery of the linear-movement ring 40 non-rotatably in the rotation direction but movably only in the optical-axis direction.

Cam pins 72 are provided at the inner periphery of the first group moving frame 32. The cam pins 72 engage with the outer cam grooves 66 of the cam ring 42.

The linear-movement ring 40 is provided at the inner periphery of the fixed ring 44 non-rotatably in the rotation direction but movably only in the optical-axis direction. The linear-movement ring 40 moves in the optical-axis direction with the fixed ring 44 by a distance in which the cam ring 42 moves in the optical-axis direction.

A face ring 41 is mounted to the outer periphery of the linear-movement ring 40, and hence, the linear-movement ring 40 and the face ring 41 are integrally provided. The face ring 41 improves mainly the appearance of the lens barrel 14.

A lens barrier unit 58 is provided at a front end of the first group moving frame 32. The lens barrier unit 58 closes the optical path, serving as a shooting aperture, and protects the imaging optical system 16 when an image is not captured.

A face ring 33 is mounted to the first group moving frame 32. The face ring 33 improves the appearance of the lens barrel 14.

The automatic exposure device 26 is electrically connected to a flexible printed circuit 26A. An end of the flexible printed circuit 26A is connected to a wiring circuit of an actuator for driving a shutter mechanism and a variable aperture mechanism of the automatic exposure device 26. Another end of the flexible printed circuit 26A is electrically connected to a power source provided outside the lens barrel 14.

The operation of the lens barrel 14 is described.

When the drive gear 52 is rotated and thus the cam ring 42 is rotated, the cam ring 42 moves in the optical-axis direction along the cam grooves 60 formed in the inner periphery of the fixed ring 44.

Also, with the rotation of the cam ring 42, the cam pins 72 of the first group moving frame 32 move in the optical-axis direction along the outer cam grooves 66 formed in the outer periphery of the cam ring 42.

Further, with the rotation of the cam ring 42, the cam pins 70 of the second group moving frame 36 move in the optical-axis direction along the inner cam grooves 68 formed in the inner periphery of the cam ring 42.

In this way, the lens barrel 14 is retracted at the housed position as shown in FIG. 5 and protrudes at the protruding position as shown in FIG. 6. Hence a lens-barrel housing operation and an optical zooming operation are performed.

Next, the second group moving frame 36, the cam ring 42, and the linear-movement guide ring 56, to which the present invention is applied, are described below in more detail.

Figure 8:
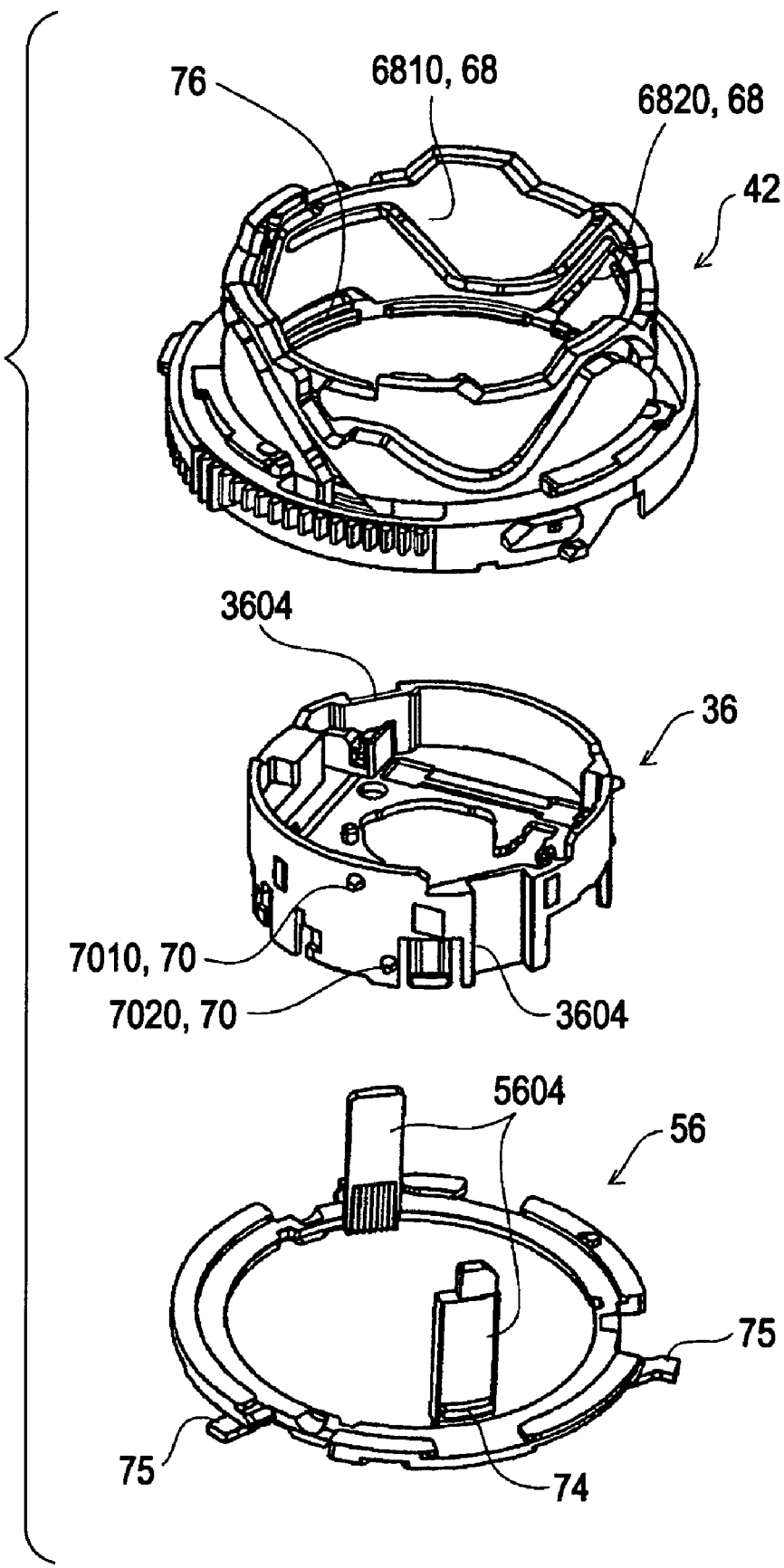
FIG. 8 is an exploded perspective view showing a second group moving frame, a cam ring, and a linear-movement guide ring.
Figure 9:
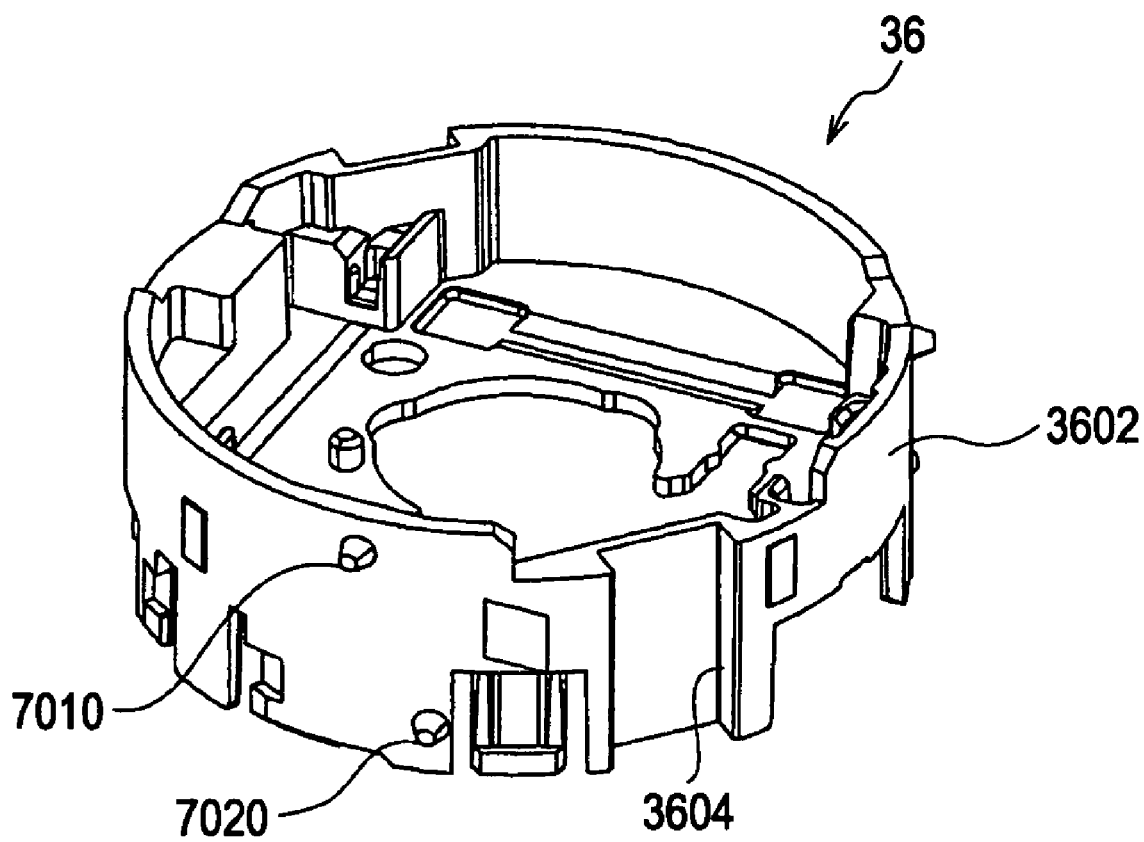
FIG. 9 is a perspective view showing the moving frame.
Figure 10:
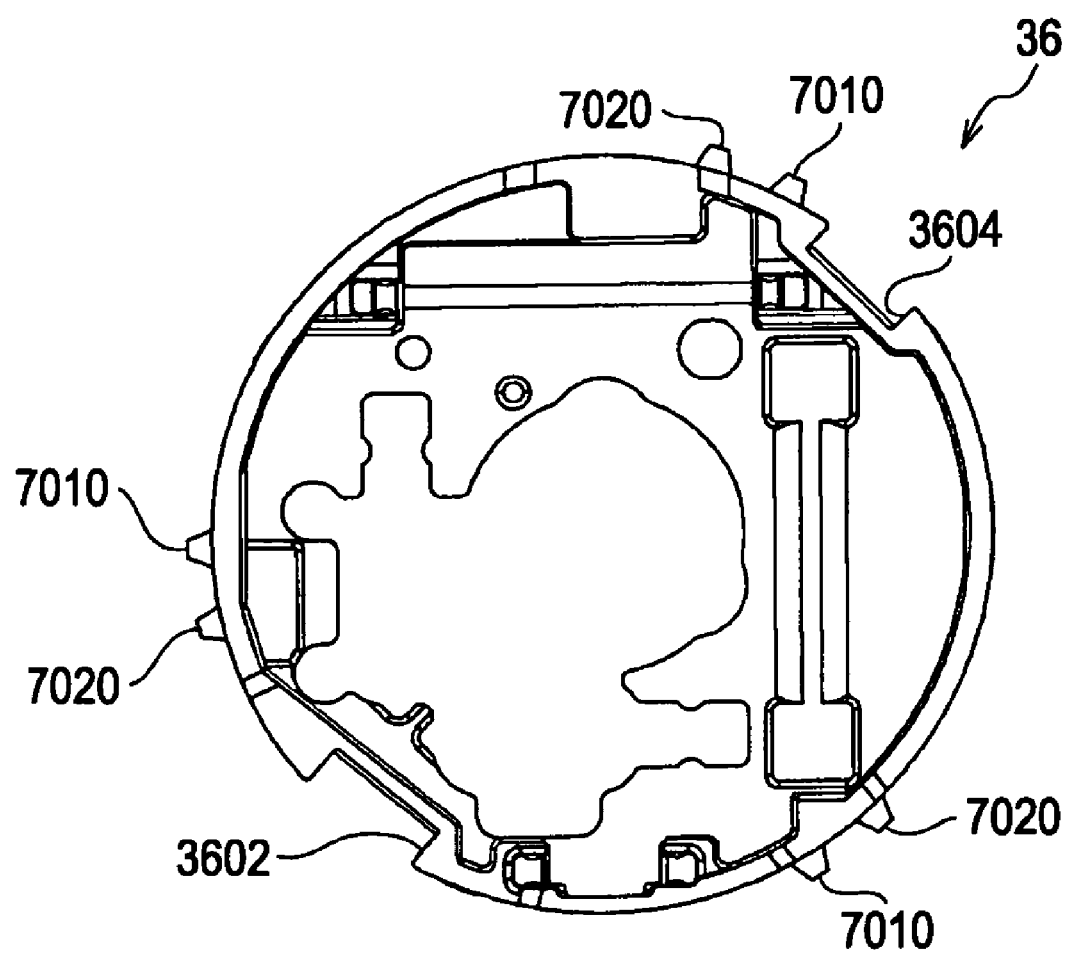
FIG. 10 is a plan view showing the moving frame.
Figure 11:
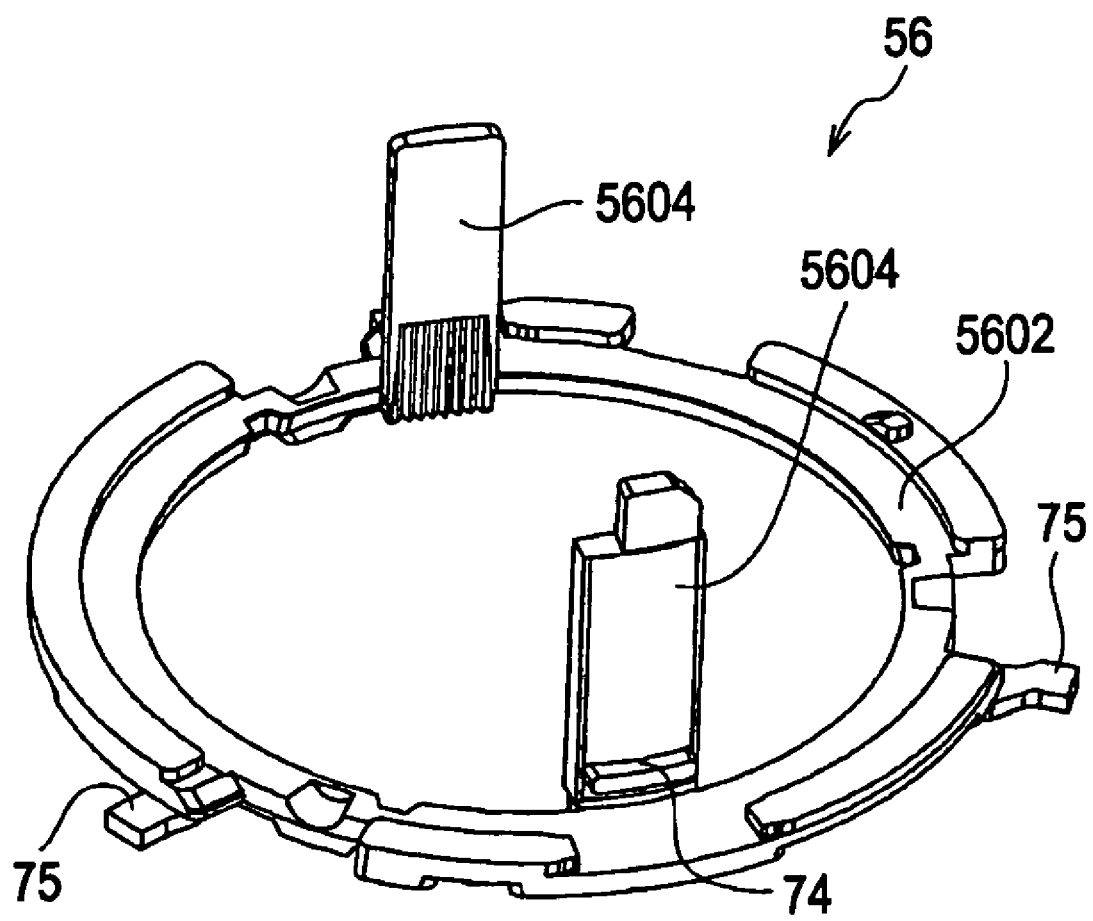
FIG. 11 is a perspective view showing the linear-movement guide ring.
Figure 12:
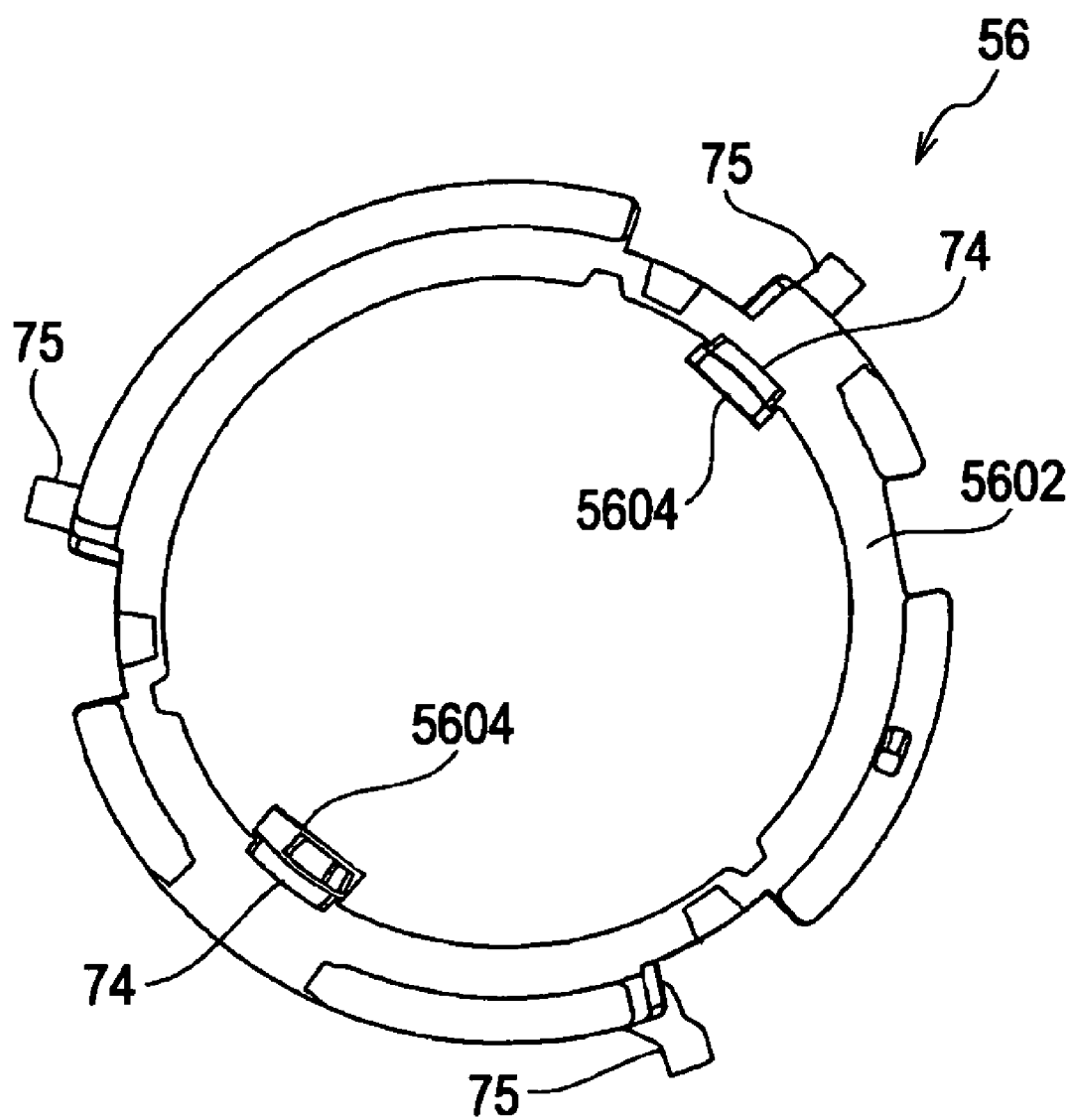
FIG. 12 is a plan view showing the linear-movement guide ring.
Figure 13:
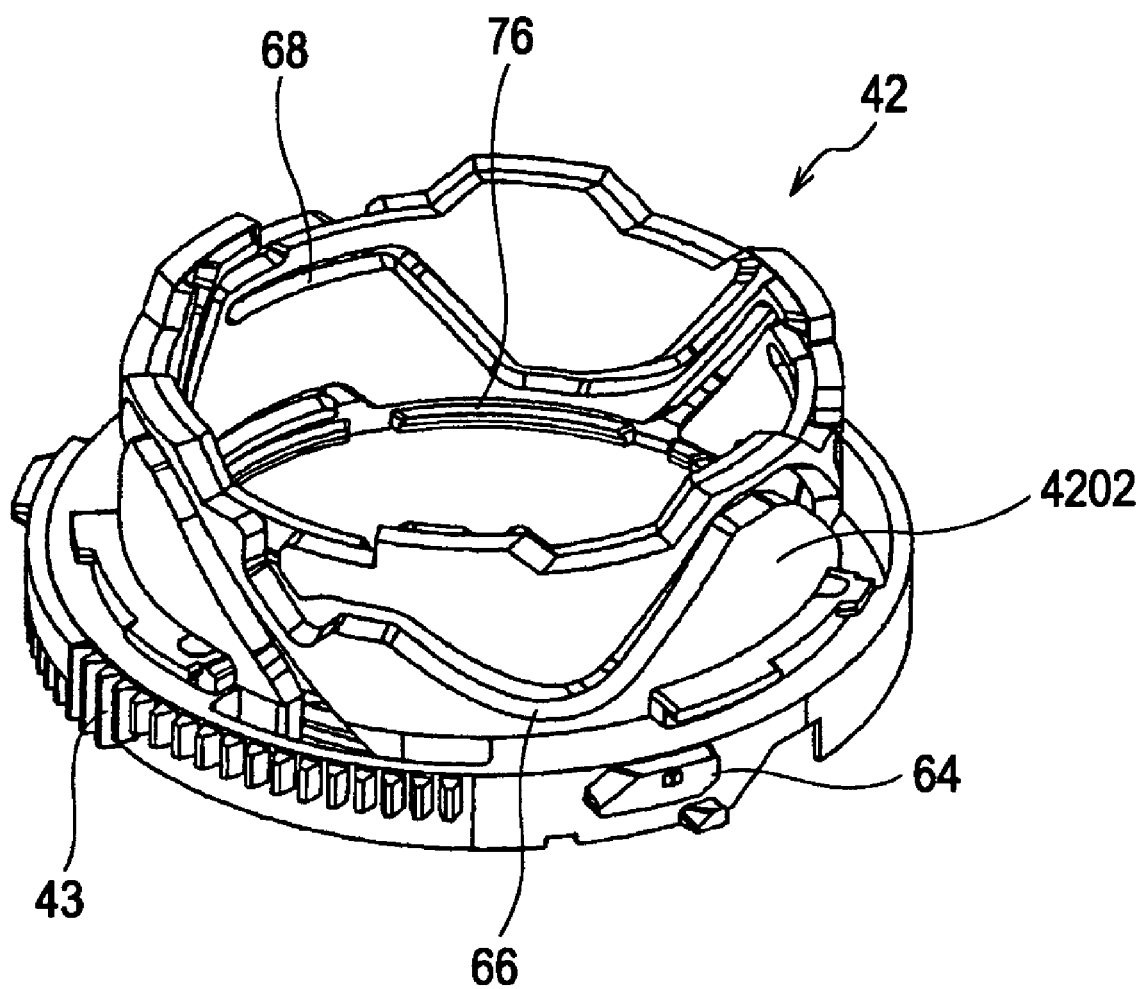
FIG. 13 is a perspective view showing the cam ring.
Figure 14:
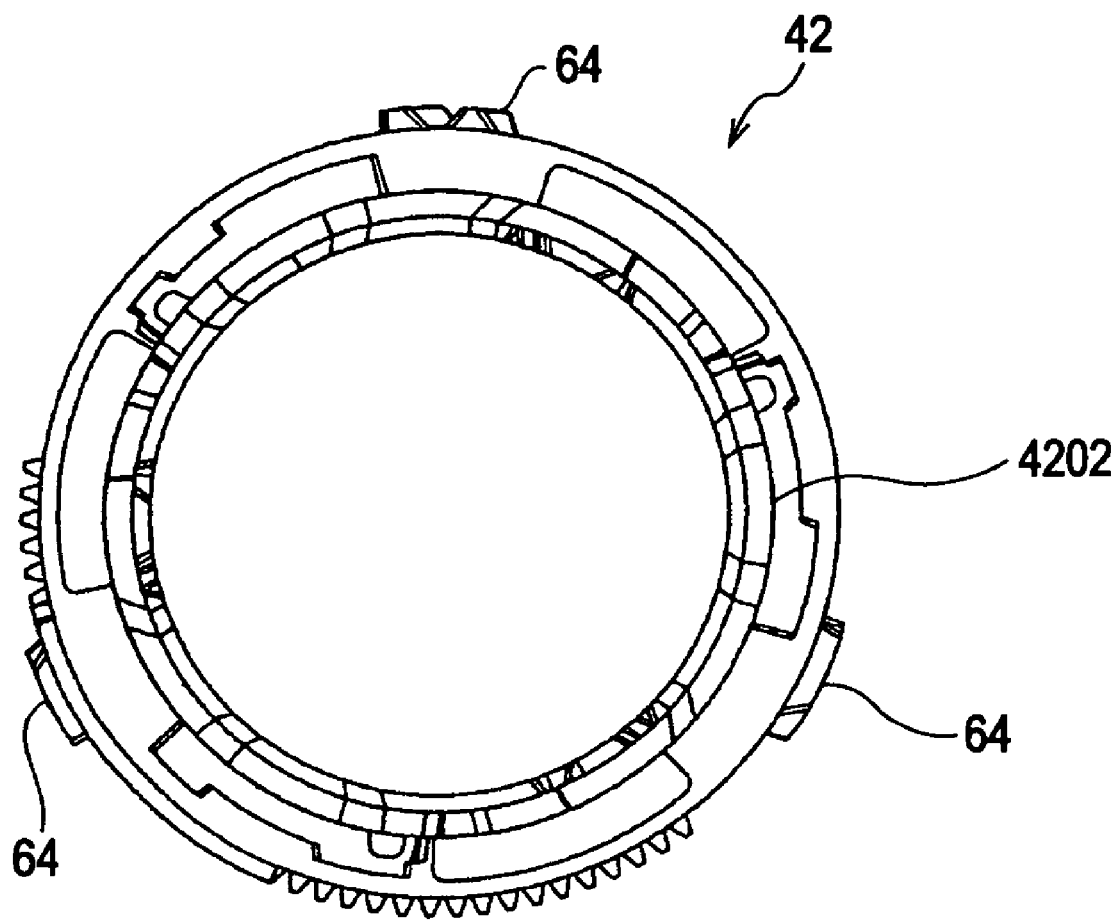
FIG. 14 is a plan view showing the cam ring.
Figure 15:
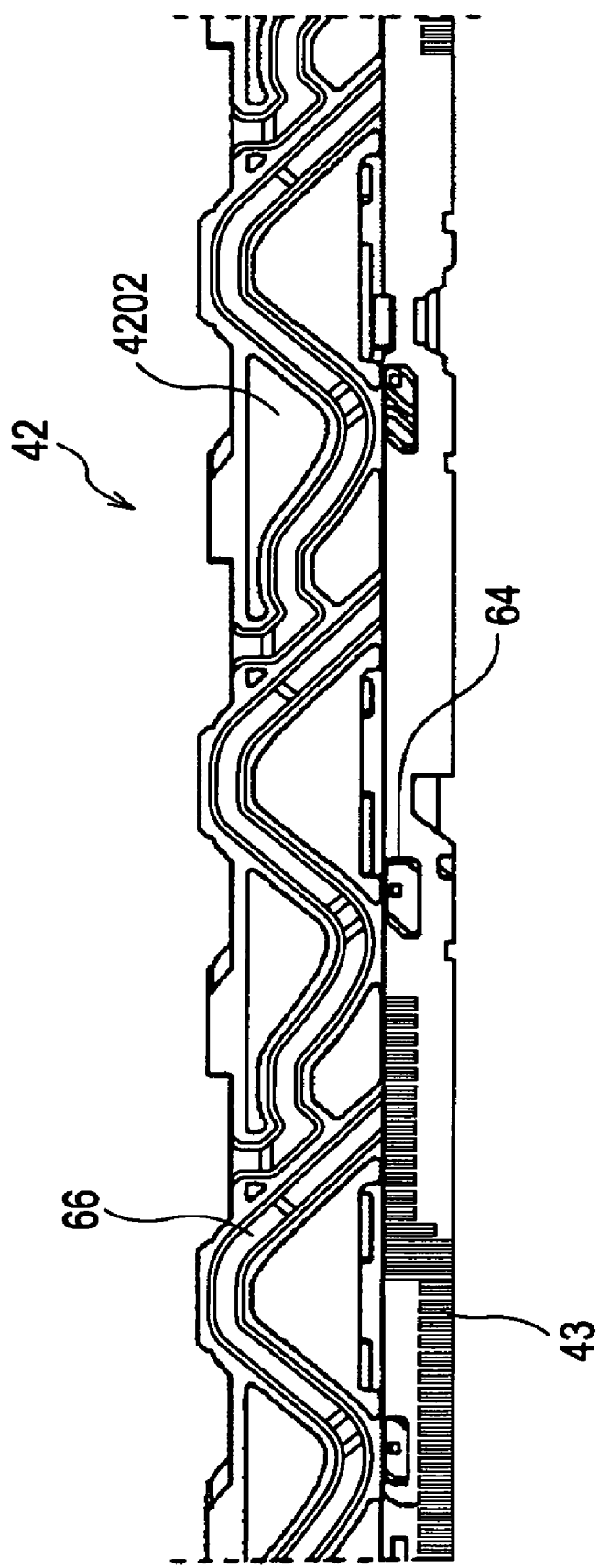
FIG. 15 is an expansion plan showing an outer peripheral surface of the cam ring.
Figure 16:
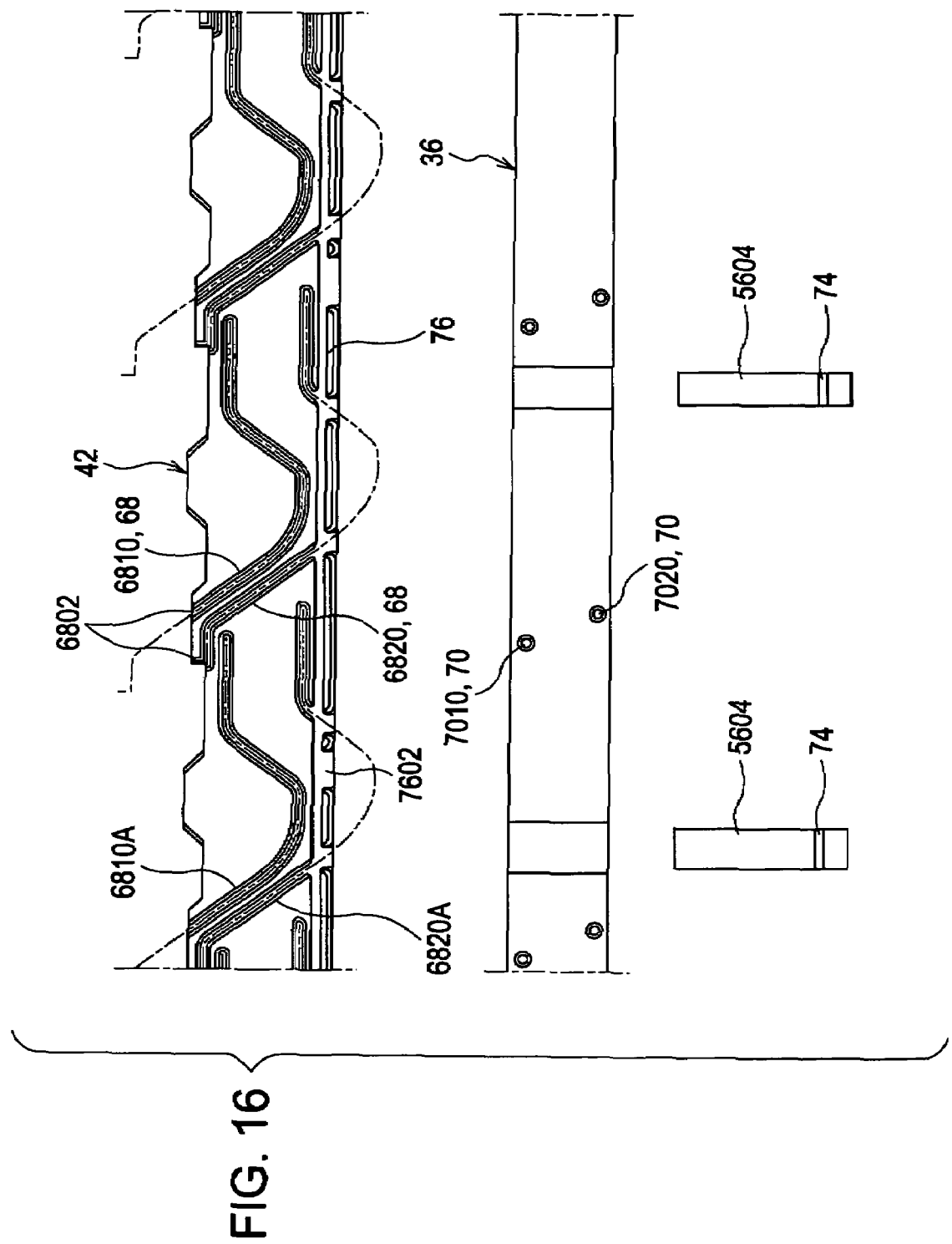
FIG. 16 is an explanatory diagram showing a positional relationship among a cam groove and an engagement groove of the cam ring, a cam pin of the moving frame, and an engagement pawl.
Figure 17:
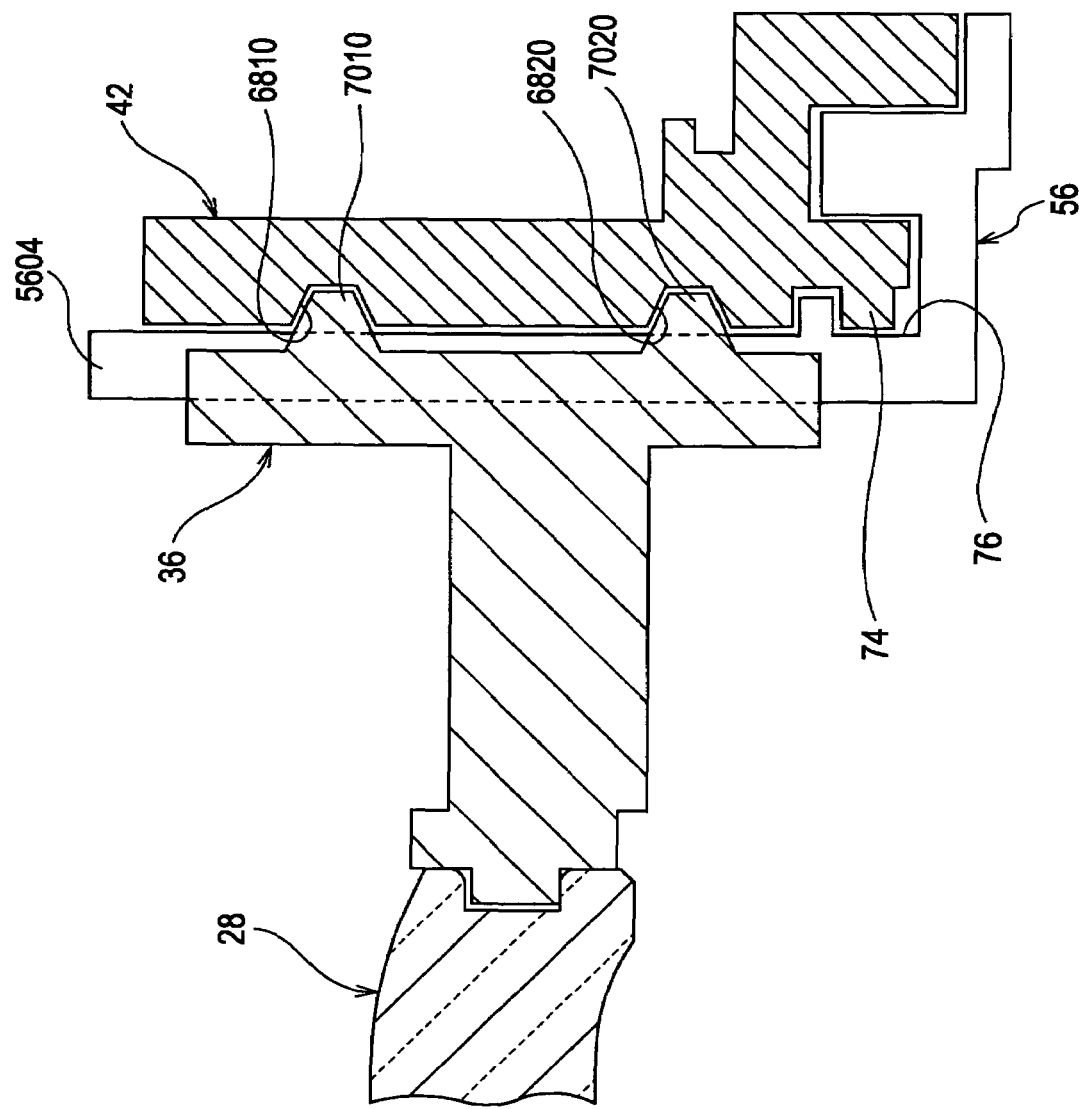
FIG. 17 is a cross-sectional view showing the second group moving frame, the cam ring, and the linear-movement guide ring.

FIG. 8 is an exploded perspective view showing the second group moving frame 36, the cam ring 42, and the linear-movement guide ring 56. FIG. 9 is a perspective view showing the moving frame 36. FIG. 10 is a plan view showing the moving frame 36. FIG. 11 is a perspective view showing the linear-movement guide ring 56. FIG. 12 is a plan view showing the linear-movement guide ring 56. FIG. 13 is a perspective view showing the cam ring 42. FIG. 14 is a plan view showing the cam ring 42. FIG. 15 is an expansion plan showing an outer peripheral surface of the cam ring 42. FIG. 16 is an explanatory diagram showing a positional relationship among the inner cam groove 68 and the engagement groove 76 of the cam ring 42, the cam pin 70 of the moving frame 36, and the engagement pawl 74. FIG. 17 is a cross-sectional view showing the second group moving frame 36, the cam ring 42, and the linear-movement guide ring 56.

The moving frame 36 supports the second lens group 28 (lens system, see FIG. 7) which forms the imaging optical system 16. Referring to FIGS. 9 and 10, the moving frame 36 has the cam pins 70.

The moving frame 36 includes a cylindrical wall 3602. The second lens group 28 is held by the second group lens frame 38 (see FIG. 7) and disposed in the cylindrical wall 3602.

Straight-movement grooves 3604 extending in an axial direction are provided in an outer peripheral surface of the cylindrical wall 3602 at two positions at intervals at 180 degrees in a circumferential direction.

The cam pins 70 are provided at three positions at intervals in a circumferential direction in a front portion of the outer peripheral surface of the cylindrical wall 3602. In addition, the cam pins 70 are provided at three positions at intervals in the circumferential direction in a rear portion of the outer peripheral surface of the cylindrical wall 3602. The positions of the cam pins 70 in the front portion are shifted from those of the cam pins 70 in the circumferential direction. Hereinafter, the cam pins 70 in the front portion are referred to as first cam pins 7010 and the cam pins 70 in the rear portion are referred to as second cam pins 7020.

The linear-movement guide ring 56 supports the moving frame 36 non-rotatably around the optical axis of the second lens group 28 but movably in the optical-axis direction of the second lens group 28. That is, the linear-movement guide ring 56 and the moving frame 36 are coupled with each other non-rotatably but movably in the optical-axis direction of the second lens group 28.

Also, the linear-movement guide ring 56 supports the cam ring 42 rotatably around the optical-axis direction of the second lens group 28 but non-movably in the optical-axis direction. That is, the linear-movement guide ring 56 and the cam ring 42 are coupled with each other mutually rotatably but non-movably in the optical-axis direction of the second lens group 28.

Referring to FIGS. 11 and 12, the linear-movement guide ring 56 has engagement pawls 74, and fixed ring engagement pawls 75 which engage with the linear-movement guide grooves 62 of the fixed ring 44.

The linear-movement guide ring 56 includes a ring plate portion 5602, and two linear-movement column portions 5604 vertically provided on the ring plate portion 5602.

The engagement pawls 74 protrude outward in a radial direction of the ring plate portion 5602 from base portions of the linear-movement column portions 5604. The engagement pawls 74 are provided at two positions of the ring plate portion 5602 at intervals in a circumferential direction.

The fixed ring engagement pawls 75 protrude outward in the radial direction of the ring plate portion 5602 from an outer peripheral portion of the ring plate portion 5602.

Referring to FIGS. 13 to 15, the cam ring 42 includes a cylindrical wall 4202. The gear portion 43 and the engagement portions 64 are provided at a rear portion of an outer peripheral portion of the cylindrical wall 4202.

The inner cam grooves 68 for engaging with the cam pins 70 and an engagement groove 76 for engaging with the engagement pawls 74 are formed in an inner peripheral surface of the cylindrical wall 4202.

The inner cam grooves 68 include a plurality of first cam grooves 6810 provided at intervals in a circumferential direction of the inner peripheral surface, and a plurality of second cam grooves 6820 provided at positions of the inner peripheral surface at the rear side with respect to the first cam grooves 6810 at intervals in the circumferential direction of the inner peripheral surface, the first and second cam grooves 6810 and 6820 having equivalent loci.

The first and second cam grooves 6810 and 6820 are provided by three each. The positions of the first cam grooves 6810 are shifted from those of the second cam grooves 6820 in the circumferential direction.

Each first cam groove 6810 has a front first cam groove portion 6810A which is located in a front portion of the first cam groove 6810.

Also, each second cam groove 6820 has a rear second cam groove portion 6820A which is located in a rear portion of the second cam groove 6820.

To reduce the length of the lens barrel 14 in a front-rear direction, the length of the cam ring 42 is reduced in the front-rear direction. Hence, as shown by a dotted-chain line in FIG. 16, a portion of the front first cam groove portion 6810A of the first cam groove 6810 is omitted. Also, as shown by a dotted-chain line in FIG. 16, a portion of the rear second cam groove portion 6820A of the second cam groove 6820 is omitted.

In addition, the first and second cam grooves 6810 and 6820 have release portions 6802 which allow the first and second cam pins 7010 and 7020 to be respectively inserted into the first and second cam grooves 6810 and 6820.

The engagement groove 76 is formed in a plane orthogonal to the axial direction of the cam ring 42 in a rear portion of the inner peripheral surface of the cam ring 42 along the circumferential direction of the inner peripheral surface.

The engagement groove 76 intersects with the second cam grooves 6820.

In this embodiment, a portion of each second cam groove 6820 located at the rear side with respect to the engagement groove 76 is omitted.

The engagement groove 76 has release portions 7602 which allow the engagement pawls 74 to be inserted into the engagement groove 76.

Each engagement pawl 74 has a width larger than a groove width of the second cam groove 6820 so as to prevent the engagement pawl 74 from entering the second cam groove 6820 through an intersection portion of the engagement groove 76 and the second cam groove 6820.

The moving frame 36, the cam ring 42, and the linear-movement guide ring 56 are assembled as follows.

Referring to FIG. 8, the moving frame 36 is inserted to the inner periphery of the cam ring 42 from the rear side of the cam ring 42, so that the first and second cam pins 7010 and 7020 of the moving frame 36 respectively engage with the first and second cam grooves 6810 and 6820 through the release portions 6802 (FIG. 16).

Then, the two linear-movement column portions 5604 of the linear-movement guide ring 56 are inserted from the rear side of the cam ring 42 through the linear-movement grooves 3604 of the moving frame 36, so that the engagement pawls 74 engage with the engagement groove 76 through the release portions 7602 (FIG. 16).

Since the linear-movement column portions 5604 are inserted through the linear-movement grooves 3604, the moving frame 36 is non-rotatably supported by the linear-movement guide ring 56.

Since the engagement pawls 74 engage with the engagement groove 76, the cam ring 42 is supported by the linear-movement guide ring 56 non-movably in the optical-axis direction.

Accordingly, as shown in FIG. 17, the moving frame 36, the cam ring 42, and the linear-movement guide ring 56 are thus assembled. When the cam ring 42 is rotated, the moving frame 36 moves in the optical-axis direction via the inner cam grooves 68 and the cam pins 70.

(Operation)

Next, operations of the moving frame 36, the cam ring 42, and the linear-movement guide ring 56 are described.

FIGS. 18A, 18B, 19C, 19D, 20E, and 20F are explanatory diagrams each showing operations of the moving frame 36, the cam ring 42, and the linear-movement guide ring 56.

It is assumed that the moving frame 36 is located at the position shown in FIG. 18A, and the first and second cam pins 7010 and 7020 are located at base ends which are end portions in extending directions of the first and second cam grooves 6810 and 6820.

Herein, when the cam ring 42 is rotated via the drive gear 52 and the gear portion 43, the first and second cam pins 7010 and 7020 move along the first and second cam grooves 6810 and 6820, and hence the moving frame 36 moves to the rear side.

At this time, as shown in FIG. 18B, the second cam pin 7020 reaches the intersection portion of the second cam groove 6820 and the engagement groove 76. Since the first cam groove 6810 engages with the first cam pin 7010, the second cam pin 7020 is prevented from disengaging from the second cam groove 6820 and entering the engagement groove 76.

Figure 19C:
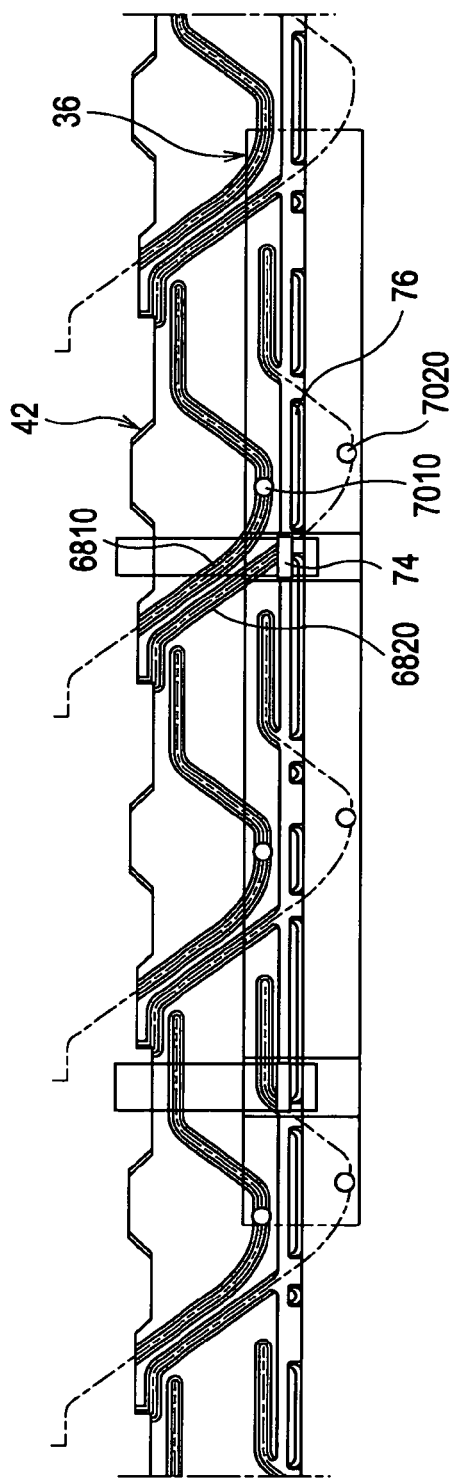
FIGS. 19C and 19D are explanatory diagrams each showing operations of the moving frame, the cam ring, and the linear-movement guide ring.

Further, when the cam ring 42 is rotated, as shown in FIG. 19C, the second cam pin 7020 disengages from the second cam groove 6820 to the outside (rear side) at the intersection portion of the second cam groove 6820 and the engagement groove 76. However, since the first cam groove 6810 engages with the first cam pin 7010, the first cam pin 7010 moves along the first cam groove 6810, and hence the moving frame 36 moves to a position at the most rear side.

At this time, the engagement pawl 74 reaches the intersection portion of the second cam groove 6820 and the engagement groove 76. Since the engagement pawl 74 has the width larger than the groove width of the second cam groove 6820, the engagement pawl 74 is prevented from disengaging from the engagement groove 76 and entering the second cam groove 6820 through the intersection portion.

Figure 19D:
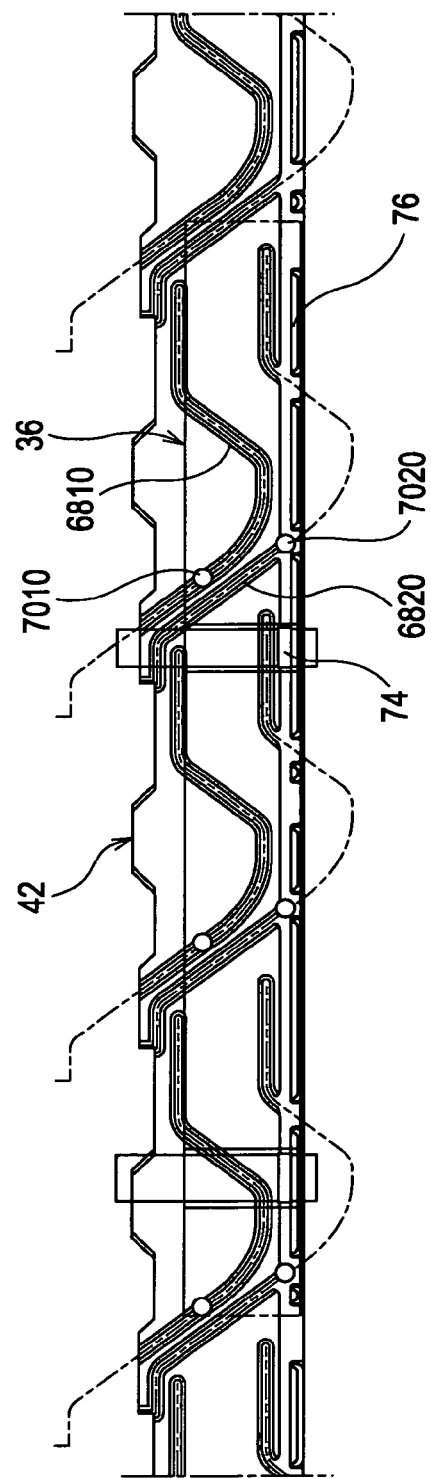

When the cam ring 42 is further rotated, as shown in FIG. 19D, the first cam pin 7010 moves along the first cam groove 6810, and the moving frame 36 moves to the front side. Then, as shown in FIG. 20E, the second cam pin 7020 disengaging from the second cam groove 6820 engages with the second cam groove 6820 through the intersection portion of the second cam groove 6820 and the engagement groove 76.

When the cam ring 42 is further rotated, the first and second cam pins 7010 and 7020 move along the first and second cam grooves 6810 and 6820, and the moving frame 36 further moves to the front side. Then, as shown in FIG. 20F, the first cam pin 7010 disengages from the first cam groove 6810 to the outside (front side) through the release portion 6802. However, since the second cam groove 6820 engages with the second cam pin 7020, the second cam pin 7020 moves along the second cam groove 6820, and hence, the moving frame 36 reaches a position at the most front side.

(Advantage)

With the above-described embodiment, although the engagement groove 76 of the cam ring 42 which engages with the engagement pawl 74 of the linear-movement guide ring 56 intersects with the second cam groove 6820 which engages with the second cam pin 7020 of the linear-movement guide ring 56, since the engagement pawl 74 of the linear-movement guide ring 56 has the width larger than the groove width of the second cam groove 6820 which intersects with the engagement groove 76, the engagement pawl 74 can be prevented from disengaging from the engagement groove 76 and entering the second cam groove 6820.

Thus, since an area occupied by the engagement groove 76 is overlapped with an area occupied by the second cam groove 6820 in the axial direction of the cam ring 42, this arrangement is advantageous to reducing the size of the cam ring 42 in the optical-axis direction and sufficiently providing the moving amount of the moving frame 36. In addition, a smooth operation of the second cam pin 7020 is provided at the intersection portion of the engagement groove 76 and the second cam groove 6820, and hence this arrangement is advantageous to stabilizing the movement of the moving frame 36 through the rotation of the cam ring 42.

In particular, in the related example, the depth of the cam groove is larger than the depth of the engagement groove at the intersection portion of the cam groove and the engagement groove, so as to prevent the cam pin from erroneously entering the engagement groove from the cam groove. Thus, the thickness of the cam ring has to be increased. This arrangement is disadvantageous to reducing the size of the cam ring in the radial direction. In contrast, with this embodiment, it is not necessary to increase the thickness. Thus, this embodiment is advantageous to reducing the size of the cam ring in the radial direction, and is further advantageous to reducing the size of the cam ring 42 and reducing the size of the lens barrel 14.

Also, with this embodiment, since the portion of the front first cam groove portion 6810A of the first cam groove 6810 and the portion of the rear second cam groove portion 6820A of the second cam groove 6820 are omitted, the length of the cam ring 42 in the front-rear direction can be reduced. Hence, this arrangement is advantageous to reducing the length of the lens barrel 14 in the front-rear direction. In addition, although the portion of the front first cam groove portion 6810A and the portion of the rear second cam groove portion 6820A are omitted, the second cam pin 7020 engages with the second cam groove 6820 when the first cam pin 7010 disengages from the first cam groove 6810 to the outside, or the first cam pin 7010 engages with the first cam groove 6810 when the second cam pin 7020 disengages from the second cam groove 6820 to the outside. Accordingly, this arrangement is advantageous to stabilizing the movement of the moving frame 36.

Second Embodiment

Next, a second embodiment is described.

Figure 21:
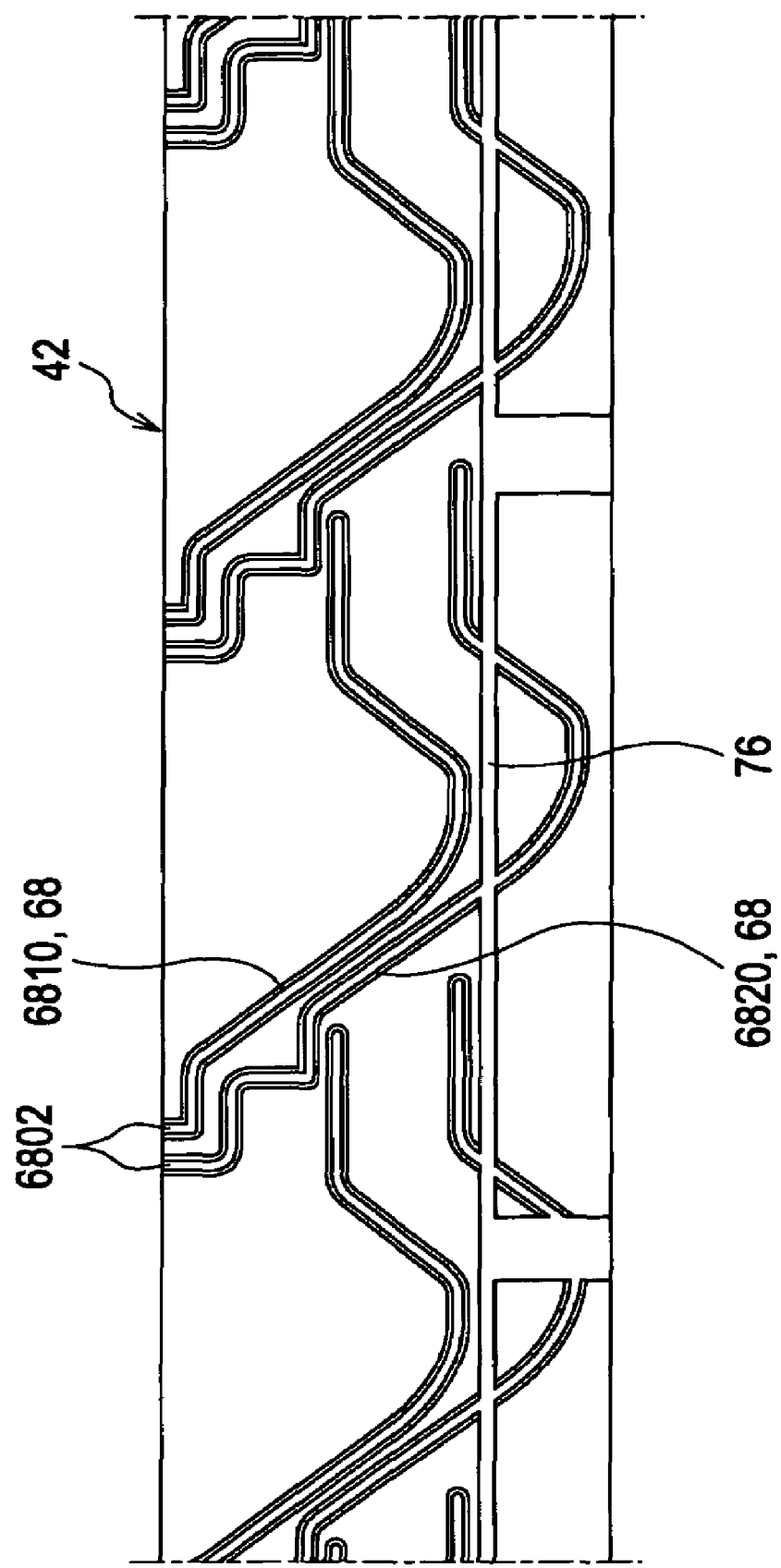
FIG. 21 is an explanatory diagram showing a positional relationship among a cam groove and an engagement groove of a cam ring, a cam pin of a moving frame, and an engagement pawl according to a second embodiment.

FIG. 21 is an expansion plan showing an inner peripheral surface of a cam ring 42 according to the second embodiment. In the following description of embodiments, like numerals refer portions and members corresponding to those of the first embodiment.

In the first embodiment, the case is described in which the portion of the front first cam groove portion 6810A of the first cam groove 6810 and the portion of the rear second cam groove portion 6820A of the second cam groove 6820 are omitted. In contrast, in the second embodiment, first and second cam grooves 6810 and 6820 are not partially omitted.

In the second embodiment, similarly to the first embodiment, an engagement groove intersects with the second cam groove 6820. Hence, advantages similar to those of the first embodiment are attained.

Third Embodiment

Next, a third embodiment is described.

The third embodiment is different from the first and second embodiments in that an engagement groove 76 intersects with both first and second cam grooves 6810 and 6820.

Figure 22:
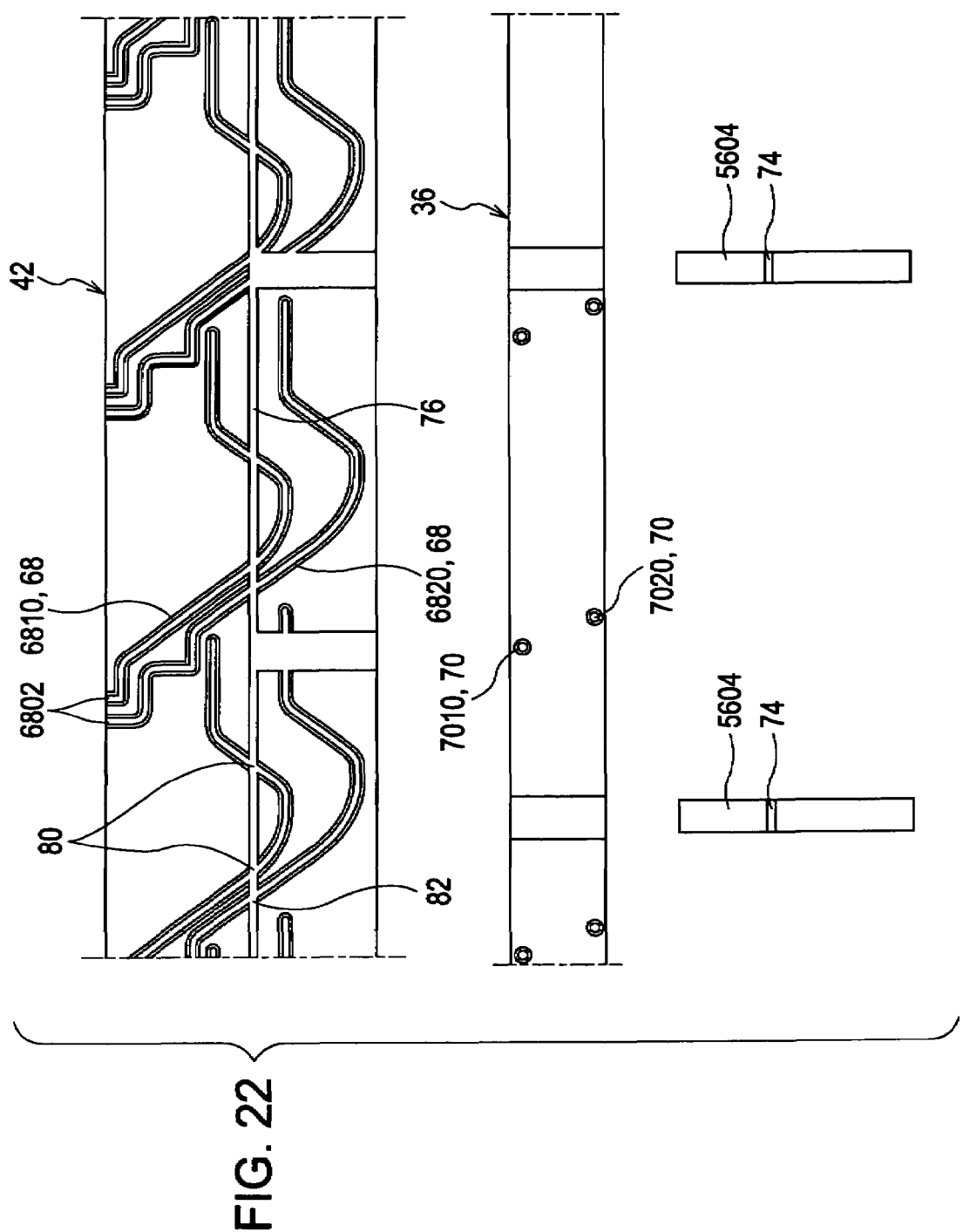
FIG. 22 is an explanatory diagram showing a positional relationship among a cam groove and an engagement groove of a cam ring, a cam pin of a moving frame, and an engagement pawl according to a third embodiment.

FIG. 22 is an explanatory diagram showing a positional relationship among an inner cam groove 68 and an engagement groove 76 of a cam ring 42, a cam pin 70 of a moving frame 36, and an engagement pawl 74.

Referring to FIG. 22, the engagement groove 76 intersects with both the first and second cam grooves 6810 and 6820. A portion in which the engagement groove 76 intersects with the first cam groove 6810 defines a first intersection portion 80, whereas a portion in which the engagement groove 76 intersects with the second cam groove 6820 defines a second intersection portion 82.

The engagement pawl 74 has a width lager than a groove width of the first cam groove 6810 so as to prevent the engagement pawl 74 from entering the first cam groove 6810 through the first intersection portion 80.

A second cam pin 7020 engages with a second cam groove portion 3820 not occupied by the second intersection portion 82 while a first cam pin 7010 is located at the first intersection portion 80. The first cam pin 7010 engages with a first cam groove portion 3810 not occupied by the first intersection portion 80 while the second cam pin 7020 is located at the second intersection portion 82.

(Operation)

Next, operations of the moving frame 36, the cam ring 42, and a linear-movement guide ring 56 are described.

FIGS. 23A, 23B, 24C, 24D, 25E, and 25F are explanatory diagrams each showing the operations of the moving frame 36, the cam ring 42, and the linear-movement guide ring 56.

Figure 23A:
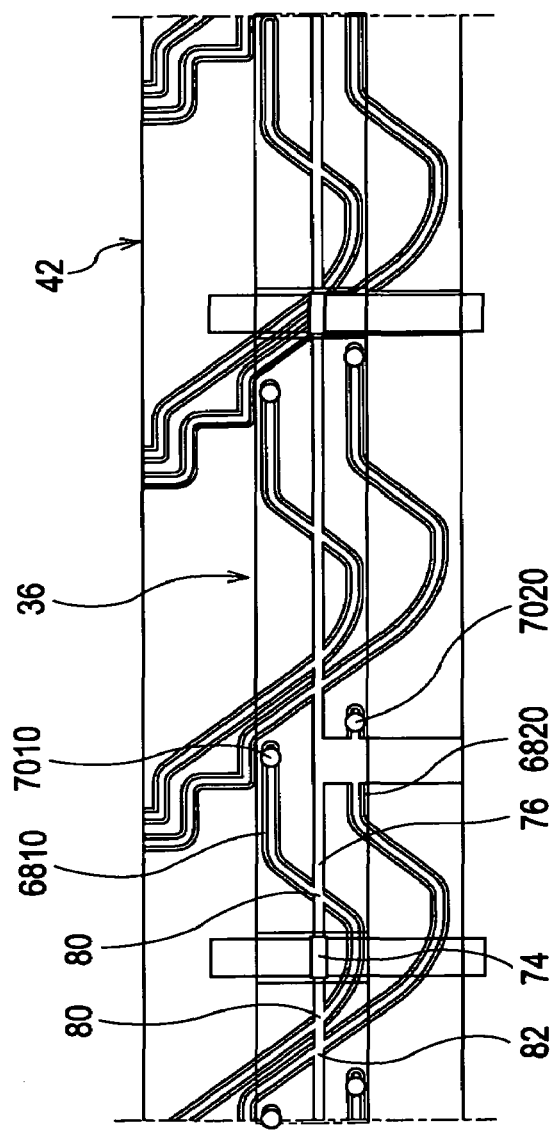
FIGS. 23A and 23B are explanatory diagrams each showing operations of the moving frame, the cam ring, and a linear-movement guide ring.

It is assumed that the moving frame 36 is located at the position shown in FIG. 23A, and the first and second cam pins 7010 and 7020 are located at base ends which are end portions in extending directions of the first and second cam grooves 6810 and 6820.

Herein, when the cam ring 42 is rotated via the drive gear 52 and the gear portion 43, the first and second cam pins 7010 and 7020 move along the first and second cam grooves 6810 and 6820, and hence the moving frame 36 moves to the rear side.

When the cam ring 42 is further rotated, the engagement pawl 74 reaches the first and second intersection portions 80 and 82. Herein, since the engagement pawl 74 has the width larger than the groove widths of the first and second cam grooves 6810 and 6820, the engagement pawl 74 is prevented from disengaging from the engagement groove 76 and entering the first cam groove 6810 through the first intersection portion 80 or entering the second cam groove 6820 through the second intersection portion 82.

Figure 23B:
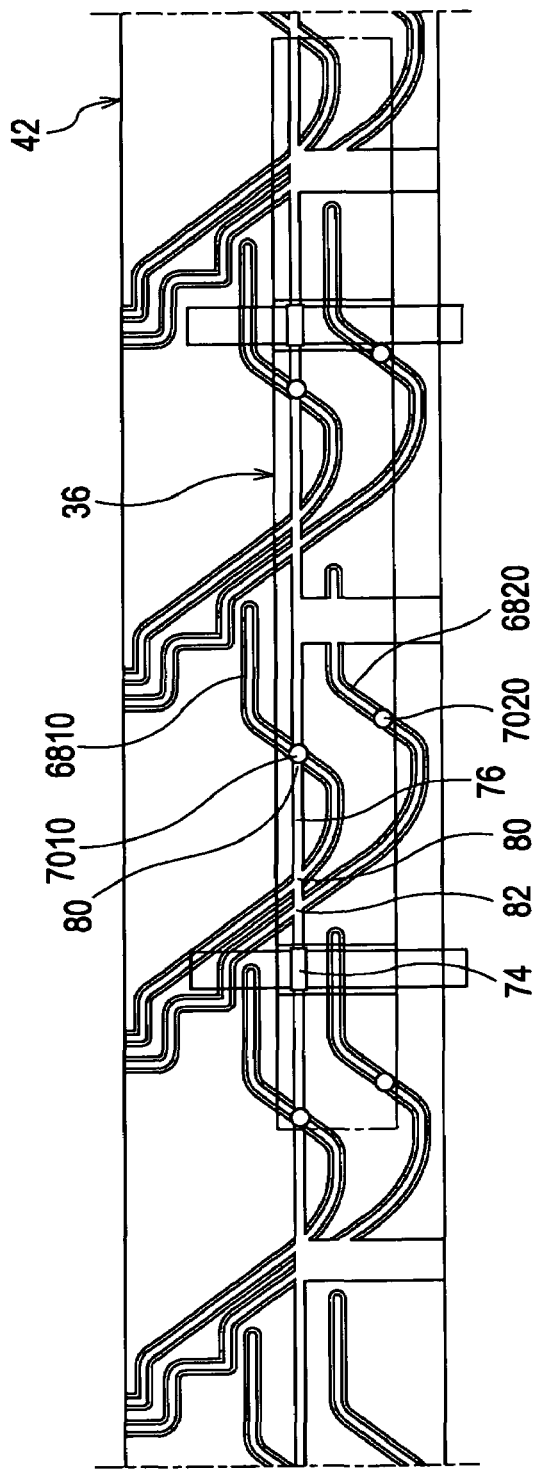

When the cam ring 42 is further rotated, referring to FIG. 23B, the first cam pin 7010 reaches the first intersection portion 80. Herein, since the second cam pin 7020 engages with the second cam groove portion 3820 not occupied by the second intersection portion 82 while the first cam pin 7010 is located at the first intersection portion 80, the first cam pin 7010 is prevented from disengaging from the first cam groove 6810 and entering the engagement groove 76.

Figure 24C:
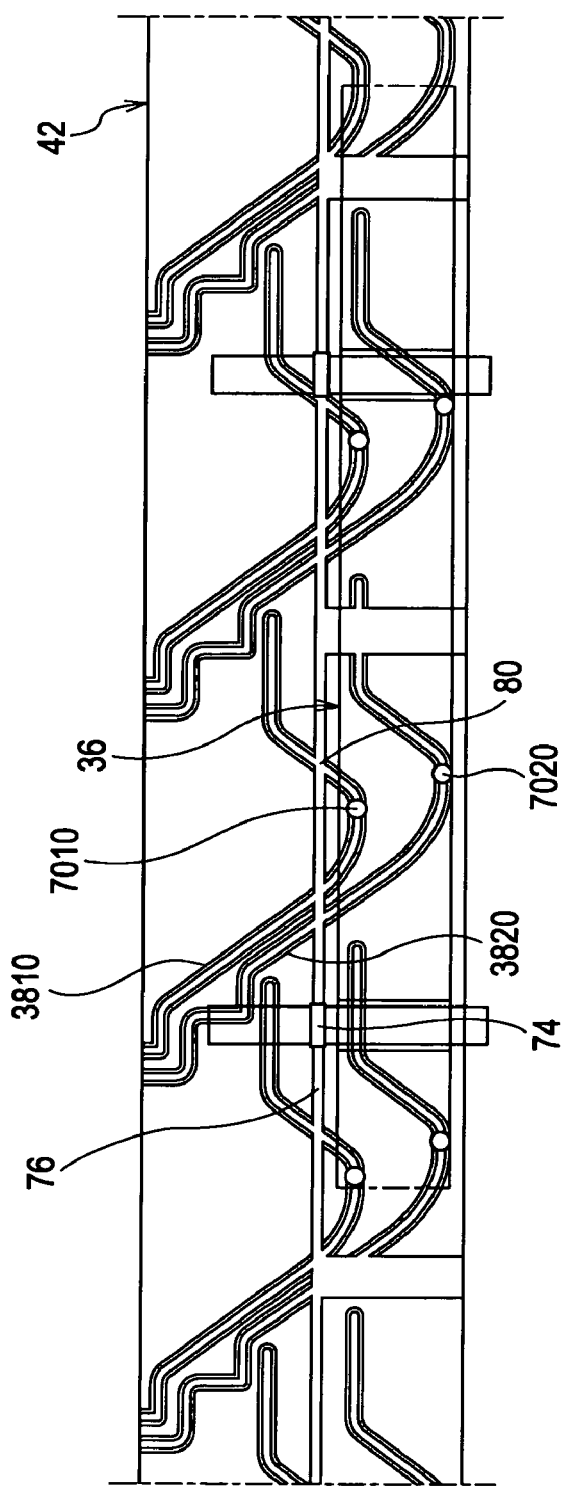
FIGS. 24C and 24D are explanatory diagrams each showing operations of the moving frame, the cam ring, and the linear-movement guide ring.

When the cam ring 42 is further rotated, referring to FIG. 24C, the first cam pin 7010 passes through the first intersection portion 80 and engages with the first cam groove 6810. Accordingly, the first and second cam pins 7010 and 7020 move along the first and second cam grooves 6810 and 6820, and the moving frame 36 moves to a position at the most rear side.

Figure 24D:
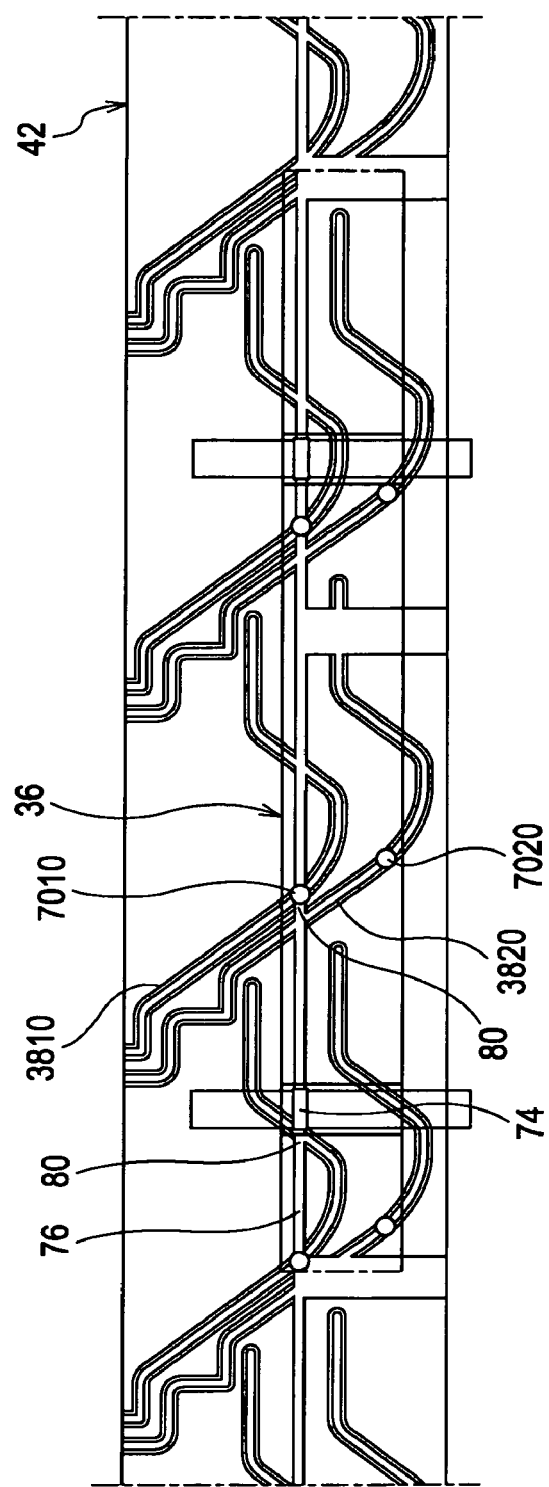

When the cam ring 42 is further rotated, referring to FIG. 24D, the moving frame 36 moves toward the front side and the first cam pin 7010 reaches the first intersection portion 80. Herein, since the second cam pin 7020 engages with the second cam groove portion 3820 not occupied by the second intersection portion 82 while the first cam pin 7010 is located at the first intersection portion 80, the first cam pin 7010 is prevented from disengaging from the first cam groove 6810 and entering the engagement groove 76.

When the cam ring 42 is further rotated, the engagement pawl 74 reaches the first intersection portion 80. Herein, since the engagement pawl 74 has the width larger than the groove width of the first cam groove 6810, the engagement pawl 74 is prevented from disengaging from the engagement groove 76 and entering the first cam groove 6810 through the first intersection portion 80.

Figure 25E:
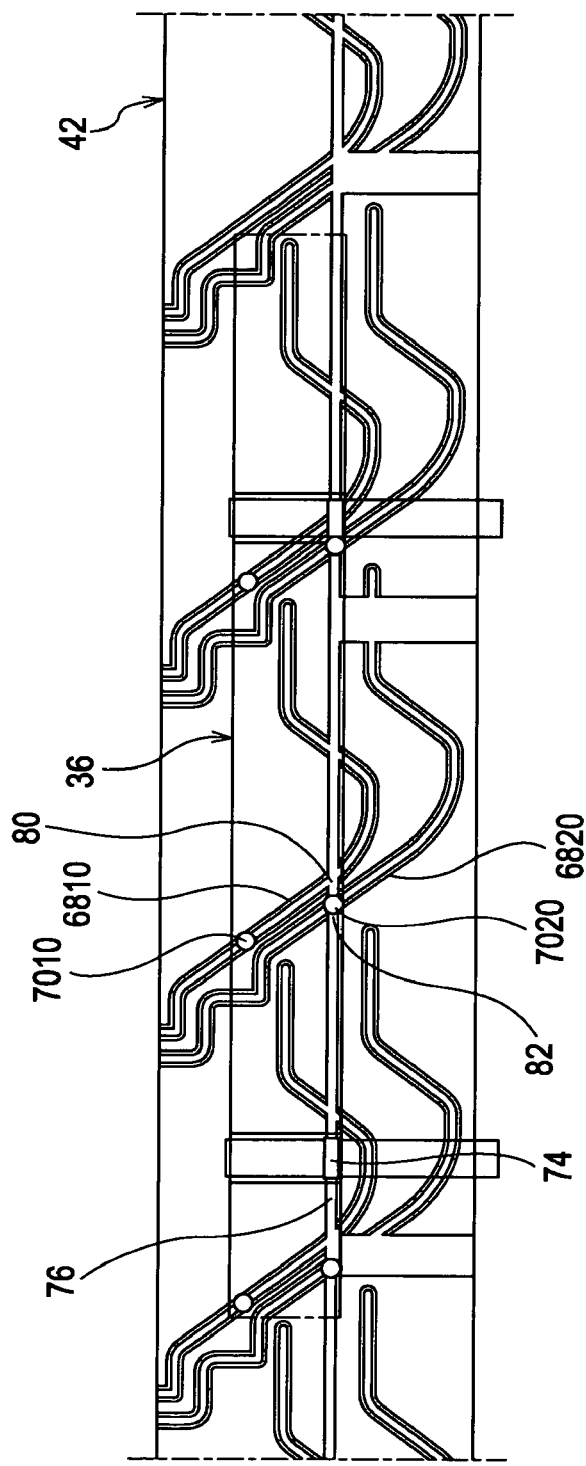
FIGS. 25E and 25F are explanatory diagrams each showing operations of the moving frame, the cam ring, and the linear-movement guide ring.

When the cam ring 42 is further rotated, referring to FIG. 25E, the moving frame 36 moves toward the front side and the second cam pin 7020 reaches the second intersection portion 82. Herein, since the first cam pin 7010 engages with the first cam groove portion 3810 not occupied by the first intersection portion 80 while the second cam pin 7020 is located at the second intersection portion 82, the second cam pin 7020 is prevented from disengaging from the second cam groove 6820 and entering the engagement groove 76.

Figure 25F:
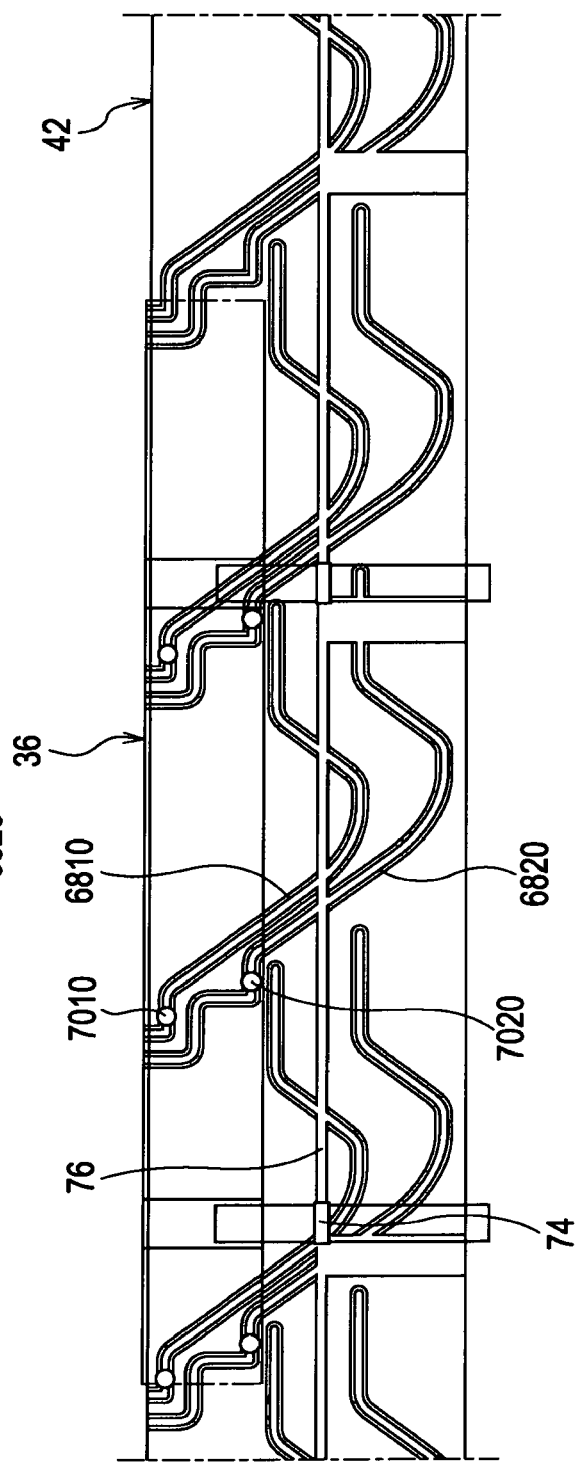

When the cam ring 42 is further rotated, the second cam pin 7020 passes through the second intersection portion 82 and engages with the second cam groove 6820. Accordingly, the first and second cam pins 7010 and 7020 move along the first and second cam grooves 6810 and 6820, and hence the moving frame 36 reaches a position at the most front side as shown in FIG. 25F.

(Advantage)

With the above-described third embodiment, similarly to the first embodiment, although the engagement groove 76 intersects with both the first and second cam grooves 6810 and 6820, since the engagement pawl 74 has the width larger than the groove widths of the first and second cam grooves 6810 and 6820, the engagement pawl 74 is prevented from entering the first cam groove 6810 through the first intersection portion 80, or the engagement pawl 74 is prevented from entering the second cam groove 6820 through the second intersection portion 82.

In addition, with the third embodiment, the second cam pin 7020 engages with the second cam groove portion 3820 not occupied by the second intersection portion 82 while the first cam pin 7010 is located at the first intersection portion 80, and the first cam pin 7010 engages with the first cam groove portion 3810 not occupied by the first intersection portion 80 while the second cam pin 7020 is located at the second intersection portion 82. Accordingly, the first and second cam pins 7010 and 7020 can be prevented from disengaging from the first and second cam grooves 6810 and 6820 through the first and second intersection portions 80 and 82. This arrangement is advantageous to providing smooth operations of the first and second cam pins 7010 and 7020, and thus stabilizing the movement of the moving frame 36 through the rotation of the cam ring 42.

In addition, similarly to the first embodiment, it is not necessary to increase the thickness of the cam ring unlike the related example. Hence, the arrangement of this embodiment is advantageous to reducing the size of the cam ring in the radial direction. Thus, this arrangement is further advantageous to reducing the size of the cam ring 42, and the size of the lens barrel 14.

It is to be noted that while the present invention has been applied to a digital still came as an example of the image pickup apparatus in the above-described embodiments, the present invention may be applied to an image pickup apparatus, such as a video camera or a TV camera.

It should be understood by those skilled in the art that various modifications, combinations, sub-combinations and alterations may occur depending on design requirements and other factors insofar as they are within the scope of the appended claims or the equivalents thereof.

What is claimed is:

1. A lens barrel comprising:
a moving frame which supports a lens system defining an imaging optical system, and has a cam pin;
a linear-movement guide ring which guides the moving frame mutually non-rotatably but movably in an optical-axis direction of the lens system; and
a cam ring which is supported by the linear-movement guide ring mutually rotatably but non-movably in the optical axis direction, and has a cam groove in a peripheral surface of the cam ring, the cam pin engaging with the cam groove,
wherein the support of the cam ring by the linear-movement guide ring is provided when an engagement pawl provided at the linear-movement guide ring engages with an engagement groove formed in the peripheral surface of the cam ring in a plane orthogonal to an axial direction of the cam ring to extend in a circumferential direction of the peripheral surface,
wherein the moving frame moves in the optical-axis direction via the cam groove and the cam pin when the cam ring is rotated,
wherein the cam groove includes a plurality of first cam grooves provided at intervals in the circumferential direction of the peripheral surface, and a plurality of second cam grooves provided at positions of the peripheral surface at intervals in the circumferential direction of the peripheral surface, the positions being different from those of the first cam grooves in an axial direction, the first and second cam grooves having equivalent loci,
wherein the cam pin includes first and second cam pins which respectively engage with the first and second cam grooves,
wherein the engagement groove intersects with at least one of the first and second cam grooves, and
wherein the engagement pawl has a width larger than a groove width of the first or second cam groove which intersects with the engagement groove.

2. The lens barrel according to claim 1,
wherein, assuming that an object side defines a front side, the first groove is provided at the front side with respect to the second cam groove, and
wherein at least one of a front first cam groove portion located in a front portion of the first cam groove and a rear second cam groove portion located in a rear portion of the second cam groove is omitted.

3. The lens barrel according to claim 1,
wherein the engagement groove intersects with both the first and second cam grooves, and
wherein, assuming that a portion in which the engagement groove intersects with each first cam groove defines a first intersection portion and a portion in which the engagement groove intersects with each second cam groove defines a second intersection portion, the second cam pin engages with the rear second cam groove potion not occupied by the second intersection portion while the first cam pin is located at the first intersection portion, and the first cam pin engages with the front first cam groove portion not occupied by the first intersection portion while the second cam pin is located at the second intersection portion.

4. An image pickup apparatus comprising:
a lens barrel which includes
a moving frame which supports a lens system defining an imaging optical system, and has a cam pin;
a linear-movement guide ring which guides the moving frame mutually non-rotatably but movably in an optical-axis direction of the lens system; and
a cam ring which is supported by the linear-movement guide ring mutually rotatably but non-movably in the optical axis direction, and has a cam groove in a peripheral surface of the cam ring, the cam pin engaging with the cam groove,
wherein the support of the cam ring by the linear-movement guide ring is provided when an engagement pawl provided at the linear-movement guide ring engages with an engagement groove formed in the peripheral surface of the cam ring in a plane orthogonal to an axial direction of the cam ring to extend in a circumferential direction of the peripheral surface,
wherein the moving frame moves in the optical-axis direction via the cam groove and the cam pin when the cam ring is rotated,
wherein the cam groove includes a plurality of first cam grooves provided at intervals in the circumferential direction of the peripheral surface, and a plurality of second cam grooves provided at positions of the peripheral surface at intervals in the circumferential direction of the peripheral surface, the positions being different from those of the first cam grooves in an axial direction, the first and second cam grooves having equivalent loci,
wherein the cam pin includes first and second cam pins which respectively engage with the first and second cam grooves,
wherein the engagement groove intersects with at least one of the first and second cam grooves, and
wherein the engagement pawl has a width larger than a groove width of the first or second cam groove which intersects with the engagement groove.

* * * * *